| (12) United States Patent | (10) Patent No.: US 11,405,138 B2 |
| Gao et al. | (45) Date of Patent: Aug. 2, 2022 |

(54) MIXED SPACE TIME AND SPACE FREQUENCY BLOCK CODING

(71) Applicant: Telefonaktiebolaget LM Ericsson (publ), Stockholm (SE)

(72) Inventors: Shiwei Gao, Nepean (CA); Robert Mark Harrison, Grapevine, TX (US); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 16/483,525

(22) PCT Filed: Dec. 14, 2017

(86) PCT No.: PCT/IB2017/057962
§ 371 (c)(1),
(2) Date: Aug. 5, 2019

(87) PCT Pub. No.: WO2018/142199
PCT Pub. Date: Aug. 9, 2018

(65) Prior Publication Data
US 2020/0119850 A1 Apr. 16, 2020

Related U.S. Application Data

(60) Provisional application No. 62/455,376, filed on Feb. 6, 2017.

(51) Int. Cl.
*H04L 1/06* (2006.01)
*H04B 7/0456* (2017.01)
(Continued)

(52) U.S. Cl.
CPC ......... *H04L 1/0606* (2013.01); *H04B 7/0456* (2013.01); *H04L 1/0643* (2013.01);
(Continued)

(58) Field of Classification Search
CPC ... H04L 1/0606; H04L 1/0643; H04L 1/0668; H04L 5/0023; H04L 5/0051; H04L 5/10; H04B 7/0456
See application file for complete search history.

(56) References Cited

U.S. PATENT DOCUMENTS

| 2013/0064216 A1* | 3/2013 | Gao ...................... H04L 5/0053 370/330 |
| 2018/0206224 A1* | 7/2018 | Hwang ............. H04W 72/0413 |
| 2020/0153576 A1* | 5/2020 | Lee ...................... H04B 7/0486 |

FOREIGN PATENT DOCUMENTS

| EP | 3046271 A1 | 7/2016 |
| WO | 2009153810 A2 | 12/2009 |
| WO | 2011106457 A2 | 9/2011 |

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.3.0, 3GPP Organizational Partners, Sep. 2016, 169 pages.

(Continued)

*Primary Examiner* — Ricky Q Ngo
*Assistant Examiner* — Stephen N Steiner
(74) *Attorney, Agent, or Firm* — Withrow & Terranova, PLLC

(57) ABSTRACT

Systems and methods for mixed space time and space frequency block coding are provided. In some embodiments, a method of operating a first node in a wireless communication network for providing time and frequency diversity includes precoding modulation symbols intended for a second node according to two antenna ports on which they are to be transmitted. In a first subset of Orthogonal Frequency-Division Multiplexing (OFDM) symbols, mapping the precoded modulation symbols to resource elements starting first (Continued)

with indices corresponds to frequency. In a different subset of OFDM symbols, mapping the precoded modulation symbols to resource elements in any two adjacent OFDM symbols starting first with indices corresponds to time. In this way, transmission efficiency may be increased by not having any resource elements unused. Additional flexibility for precoding may also be provided when there is no symbol pair mapped to resource elements across two resource blocks.

32 Claims, 22 Drawing Sheets

(51) Int. Cl.
*H04L 5/00* (2006.01)
*H04L 5/10* (2006.01)

(52) U.S. Cl.
CPC .......... *H04L 1/0668* (2013.01); *H04L 5/0023* (2013.01); *H04L 5/0051* (2013.01); *H04L 5/10* (2013.01)

(56) References Cited

OTHER PUBLICATIONS

Catt, et al., "R1-1613277: WF on orphan RE for semi-open-loop," Third Generation Partnership Project (3GPP), TSG RAN1 Meeting #87, Nov. 14-18, 2016, 4 pages, Reno, USA.

Huawei, et al., "R1-1613650: WF on DL MIMO transmission schemes for data transmission," Third Generation Partnership Project (3GPP), TSG RAN WG1 Meeting #87, Nov. 14-18, 2016, 3 pages, Reno, USA.

LG Electronics, "R1-1611751: Discussion on semi-OL for eFD-MIMO," Third Generation Partnership Project (3GPP), TSG RAN WG1 Meeting #87, Nov. 14-18, 2016, 4 pages, Reno, USA.

International Search Report and Written Opinion for International Patent Application No. PCT/IB2017/057962, dated Apr. 5, 2018, 16 pages.

\* cited by examiner

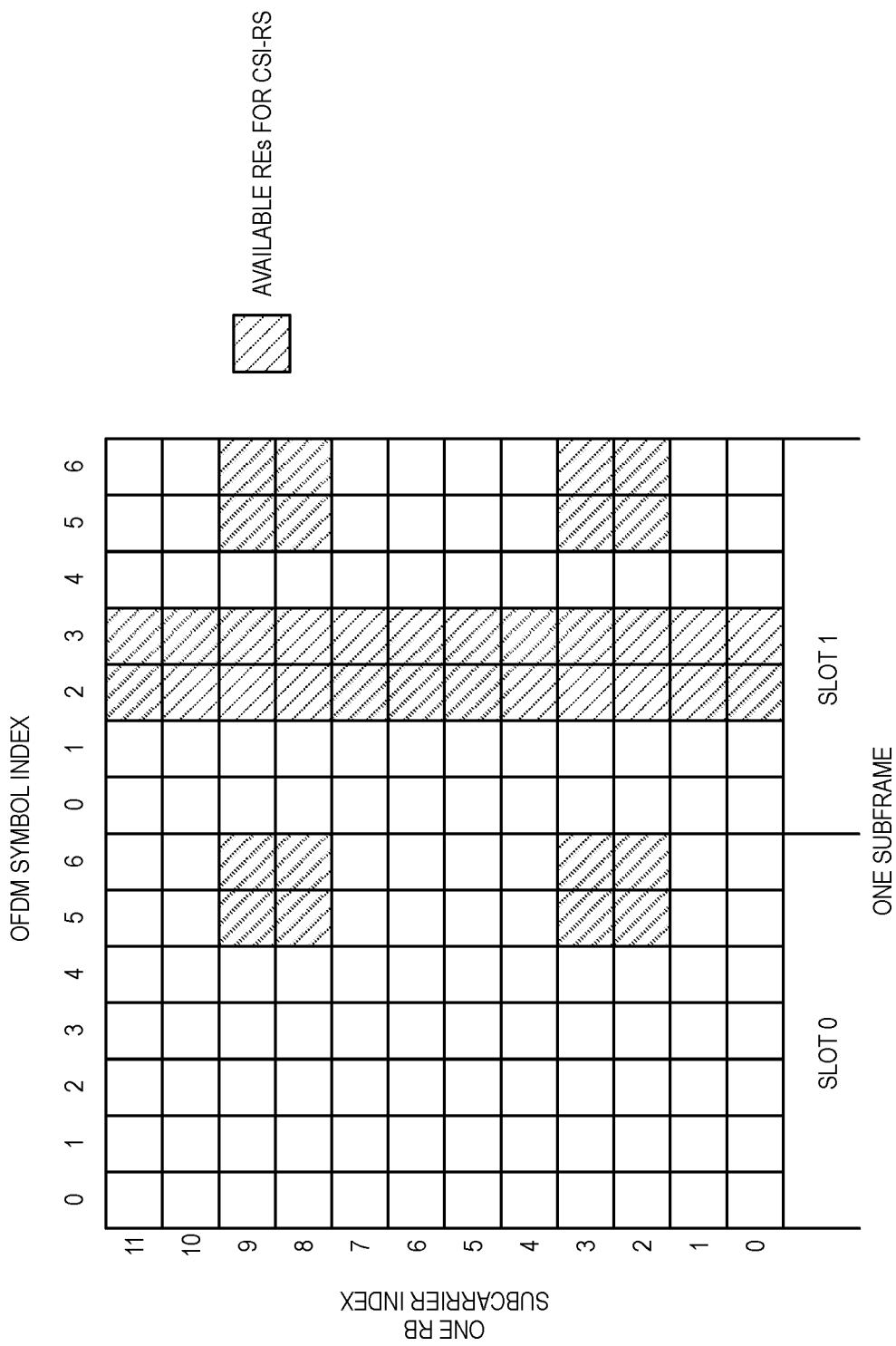

TRANSMIT A PHYSICAL CHANNEL USING A MIXED SPACE FREQUENCY BLOCK CODING (SFBC) AND A SPACE TIME BLOCK CODING (STBC) — 100A

FIG. 11A

PRECODE MODULATION SYMBOLS ACCORDING TO ANTENNA PORTS ON WHICH THEY ARE TO BE TRANSMITTED — 200A

IN A FIRST SUBSET OF OFDM SYMBOLS, MAP THE PRECODED MODULATION SYMBOLS TO RESOURCE ELEMENTS STARTING FIRST WITH INDICES CORRESPONDING TO FREQUENCY — 202 A

IN A DIFFERENT SUBSET OF OFDM SYMBOLS, MAP THE PRECODED MODULATION SYMBOLS TO RESOURCE ELEMENTS STARTING FIRST WITH INDICES CORRESPONDING TO TIME — 204A

FIG. 12A

MIXED SPACE TIME AND SPACE FREQUENCY BLOCK CODING

RELATED APPLICATIONS

This application is a 35 U.S.C. § 371 national phase filing of International Application No. PCT/I62017/057962, filed Dec. 14, 2017, which claims the benefit of provisional patent application Ser. No. 62/455,376, filed Feb. 6, 2017, the disclosures of which are hereby incorporated herein by reference in its entirety their entireties.

TECHNICAL FIELD

The present disclosure relates generally to mapping symbols to resource elements.

BACKGROUND

Semi-open-loop transmission was introduced in Long Term Evolution (LTE) Rel-14. The motivation was to provide more robust transmission for high mobility UEs when a large number of antenna ports are deployed, in which the antenna beam formed by a feedback precoder becomes narrow. For rank=1 transmission, Space Frequency Block Coding (SFBC) based transmit diversity is used based on DMRS ports 7 and 8. The idea was that two beams will be formed, one over DMRS port 7 and the other over DMRS port 8. The two beams would provide a better coverage for a UE with high mobility. However, improved block coding schemes are needed.

SUMMARY

Systems and methods for mixed space time and space frequency block coding are provided. In some embodiments, a method of operating a first node with multiple transmit antennas in a wireless communication network for providing space time and space frequency diversity includes precoding modulation symbols intended for a second node according to two antenna ports on which they are to be transmitted. In a first subset of Orthogonal Frequency-Division Multiplexing (OFDM) symbols, mapping the precoded modulation symbols to resource elements starting first with indices corresponds to frequency. In a different subset of OFDM symbols, mapping the precoded modulation symbols to resource elements in any two adjacent OFDM symbols starting first with indices corresponds to time. In this way, transmission efficiency may be increased by not having any resource elements unused. Additional flexibility for precoding may also be provided when there is no symbol pair mapped to resource elements across two resource blocks.

In some embodiments, the method also includes configuring the second node with a downlink semi-open-loop transmission scheme and transmitting, to the second node, the precoded modulation symbols over the mapped resource elements of the two antenna ports.

In some embodiments, the first subset of OFDM symbols uses Space Frequency Block Coding (SFBC) and the different subset of OFDM symbols uses Space Time Block Coding (STBC).

In some embodiments, SFBC is applied in OFDM symbols not containing Demodulation Reference Signal (DMRS) or Channel State Information Reference Signal (CSI-RS). In some embodiments, STBC is applied in OFDM symbols containing DMRS or CSI-RS. In some embodiments, the two antenna ports are DMRS ports.

In some embodiments, either SFBC or STBC is used in each OFDM symbol such that either: a) all resource elements in an OFDM symbol use SFBC; or b) STBC is used over a pair of adjacent OFDM symbols, where each resource element in the first OFDM symbol of the pair is paired with only one resource element in the other symbol of the pair.

In some embodiments, using STBC comprises only using STBC on Physical Resource Block (PRB) boundaries; Precoding Resource Block Group (PRG) boundaries; and/or allocation boundaries.

In some embodiments, every resource element is assigned an OFDM symbol from either the first subset of OFDM symbols or the different set of OFDM symbols. In other words, there are no orphan resource elements.

In some embodiments, for a plurality of signal pairs, each signal pair is mapped to a same Resource Block (RB). In other words, there is no pair split between two resource blocks. In some embodiments, each block of RBs is within a Precoding RB Group (PRG).

In some embodiments, mapping the precoded modulation symbols to resource elements for the first subset of OFDM symbols and the different subset of OFDM symbols is based on DMRS.

In some embodiments, either SFBC or STBC is used in each OFDM symbol such that either: a) all resource elements in an OFDM symbol use SFBC; or b) STBC is used over a pair of adjacent OFDM symbols, where each resource element in the first OFDM symbol of the pair is paired with only one resource element in the other symbol of the pair.

In some embodiments, mapping the precoded modulation symbols to resource elements for the first subset of OFDM symbols and the different subset of OFDM symbols includes, doing the following for each antenna port. For OFDM symbols not reserved for other purposes such as DMRS or CSI-RS, mapping the block of complex-valued symbols $\{y^{(p)}(0), y^{(p)}(1), \ldots, y^{(p)}(M_{symb}^{layer}-1)\}$ in sequence starting with $y^{(p)}(0)$ to resource element (k,l) on antenna port $p \in \{7,8\}$ in increasing order of first the index k over the assigned RBs and then index l, starting with the first slot in a subframe, where k is the subcarrier index and $l \in \{0,1, \ldots, 6\}$ the OFDM symbol index. For OFDM symbols reserved for other purposes such as DMRS or CSI-RS, mapping symbol pair $\{y^{(p)}(2i), y^{(p)}(2i+1)\}$ to REs in adjacent OFDM symbols, i.e. $\{(k,l),(k,l+1)\}$ in increasing order of first the index k over the assigned RBs and then index l.

In some embodiments, mapping the precoded modulation symbols to resource elements for the first subset of OFDM symbols and the different subset of OFDM symbols includes, if DMRS based SFBC or Large Delay Cyclic Delay Diversity (LD-CDD) is configured, then the mapping of precoded modulation symbols is such that in OFDM symbols not containing CSI-RS or DMRS, the mapping to resource elements (k,l) on antenna port p not reserved for other purposes will be in increasing order of first the index k over the assigned physical resource blocks and then the index l, starting with the first slot in a subframe. In OFDM symbols l and l+1 containing CSI-RS or DMRS, the mapping to resource elements (k,l) on antenna port p not reserved for other purposes continues in OFDM symbol l from OFDM symbol l−1 and will be in increasing order of first the index l over the assigned physical resource blocks and then the index k.

In some embodiments, the first node is a radio access node. In some embodiments, the second node is a wireless device.

In some embodiments, a method of operation of a first node with multiple transmit antennas in a wireless communication network includes transmitting a physical channel using a mixed Space Frequency Block Coding, SFBC, and a Space Time Block Coding, STBC.

In some embodiments, it is proposed to map a pair of modulation symbols $\{y^{(p)}(2i), y^{(p)}(2i+1)\}$ to be transmitted on a DMRS port, p∈{port 7, port 8}, in adjacent OFDM symbols containing DMRS and/or CSI-RS. In this case, there would be no "orphan" RE and thus there are no wasted resources as orphan REs. Furthermore, the precoding used on the REs in each of the OFDM symbols is the same within each RB, thus the interference produced with STBC or per RE-level precoder cycling can be known to a victim UE, allowing it to suppress more interfering layers than when the interferer precoding is not known.

In some embodiments, there would be no orphan REs with the proposed solution and thus no wasted resources. There is no restriction on precoding as there is no symbol pair mapped to REs across two RBs.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 6A and 6B illustrate resource element grids over an RB pair showing potential positions for CSI Reference Signals (CSI-RS) according to some embodiments of the present disclosure;

FIGS. 11A through 13A illustrate procedures for mapping symbols to resource elements according to some embodiments of the present disclosure;

FIGS. 11B through 13B illustrate procedures for receiving symbols mapped to resource elements according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that although terminology from 3GPP LTE has been used in this disclosure, this is merely for ease of description. The embodiments disclosed herein are not limited thereto. Other wireless systems, including Wideband Code-Division Multiple Access (WCDMA), WiMax, Ultra Mobile Broadband (UMB), Global System for Mobile communications (GSM) and 5th generation New Radio access technology (NR), may also benefit from exploiting the ideas covered within this disclosure.

Also note that terminology such as eNodeB and UE should be considering non-limiting and does in particular not imply a certain hierarchical relation between the two; in general, "eNodeB" could be considered as device 1 and "UE" device 2, and these two devices communicate with each other over some radio channel. In 5th generation New Radio access technology eNodeB is equivalently referred to as gNB. Also, many embodiments discussed herein focus on wireless transmissions in the downlink, but the current disclosure is not limited thereto. Embodiments disclosed herein are equally applicable in the uplink.

Figure 1:
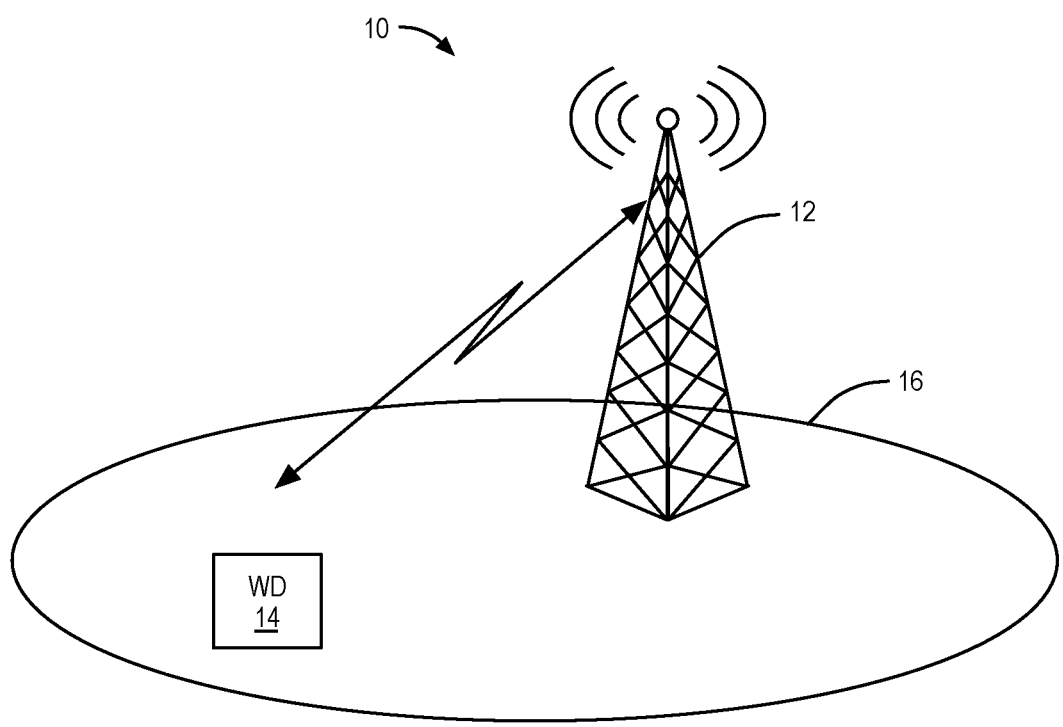
FIG. 1 illustrates a wireless communication system with a first node acting as a transmitter and a second node acting as a receiver according to some embodiments of the current disclosure.
Figure 2:
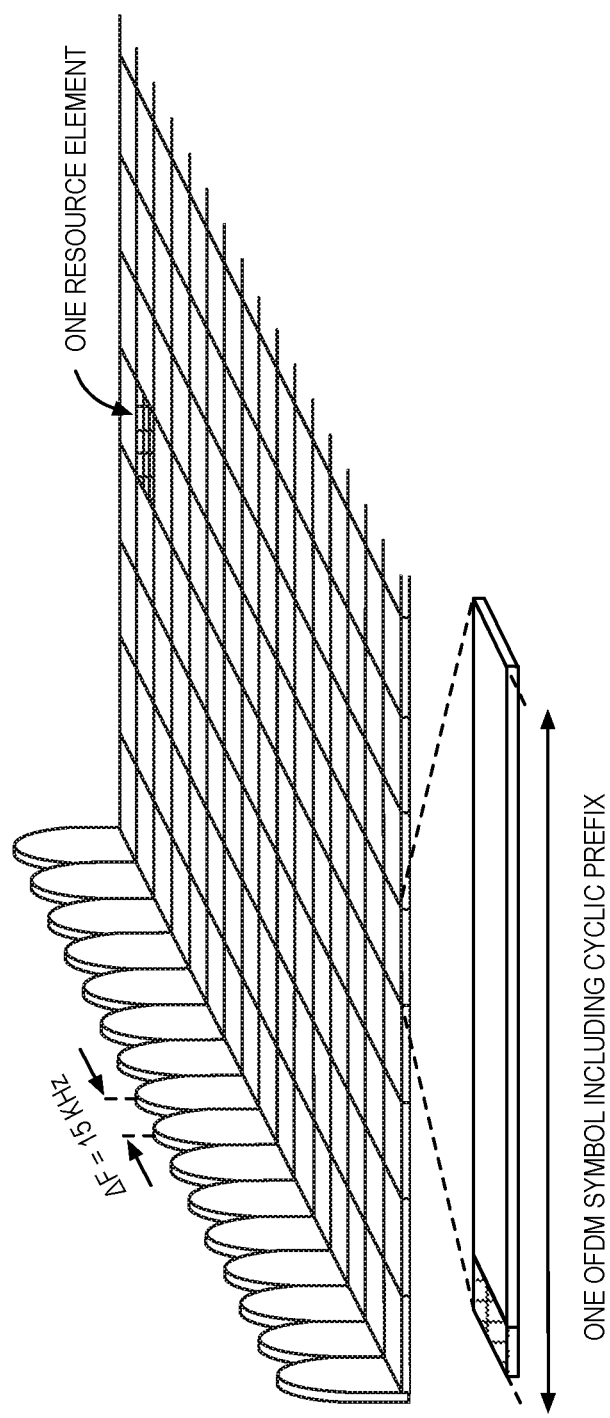
FIG. 2 illustrates an exemplary downlink physical resource such as is used in the Long Term Evolution (LTE) communications network that illustrates a relationship between time, frequency, and Orthogonal Frequency-Division Multiplexing (OFDM) symbols, according to some embodiments of the current disclosure.

In this regard, FIG. 1 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a Long Term Evolution User Equipment (LTE UE). Note that the term "UE" is used herein in its broad sense to mean any wireless device. As such, the terms "wireless device" and "UE" are used interchangeably herein. Generally 'first node' can be regarded as a 'transmitting node' and 'second node' can be regarded as a 'receiving node'. In some embodiments where the LTE uses OFDM (Orthogonal Frequency Division Multiplexing) in the downlink and Discrete Fourier Transform (DFT)-spread OFDM in the uplink. The basic LTE downlink physical resource can thus be seen as a time-frequency grid as illustrated in FIG. 2, where each Resource Element (RE) corresponds to one OFDM subcarrier during one OFDM symbol interval. An RE thus can be described by an index pair (k,l) with k being subcarrier index in frequency domain and l the OFDM symbol index in time domain.

Figure 3:
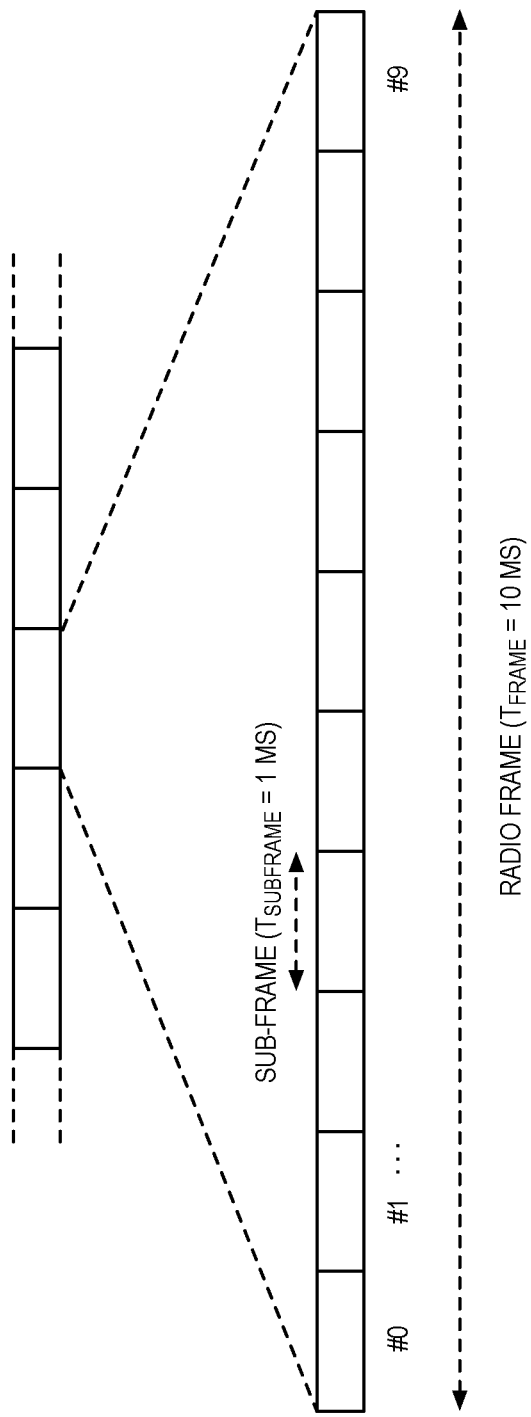
FIG. 3 illustrates an exemplary time-domain structure resource such as is used in the LTE communications network that illustrates a relationship between a radio frame and a subframe, according to some embodiments of the current disclosure.

In the time domain, LTE downlink transmissions are organized into radio frames of 10 ms as shown in FIG. 3, each radio frame consisting of ten equally-sized subframes of length $T_{subframe}=1$ ms. Furthermore, each subframe is further divided into two slots each of 0.5 ms. In normal cyclic prefix (CP), each slot consists of seven OFDM symbols, while in extended CP; each slot may consist of six OFDM symbols with 15 kHz subcarrier spacing.

Furthermore, the resource allocation in LTE is typically described in terms of physical resource blocks (PRBs), where a PRB corresponds to one slot (0.5 ms) in the time domain and twelve contiguous subcarriers in the frequency domain. Resource blocks are numbered in the frequency domain, starting with 0 from one end of the system bandwidth. Two PRBs in a subframe forms a PRB pair, which is the minimum scheduling unit in LTE. In the following discussions, for simplicity, a PRB is used to also refer to a PRB pair. The terms, RB (resource block) and PRB are used interchangeably, in the present disclosure.

Figure 4:
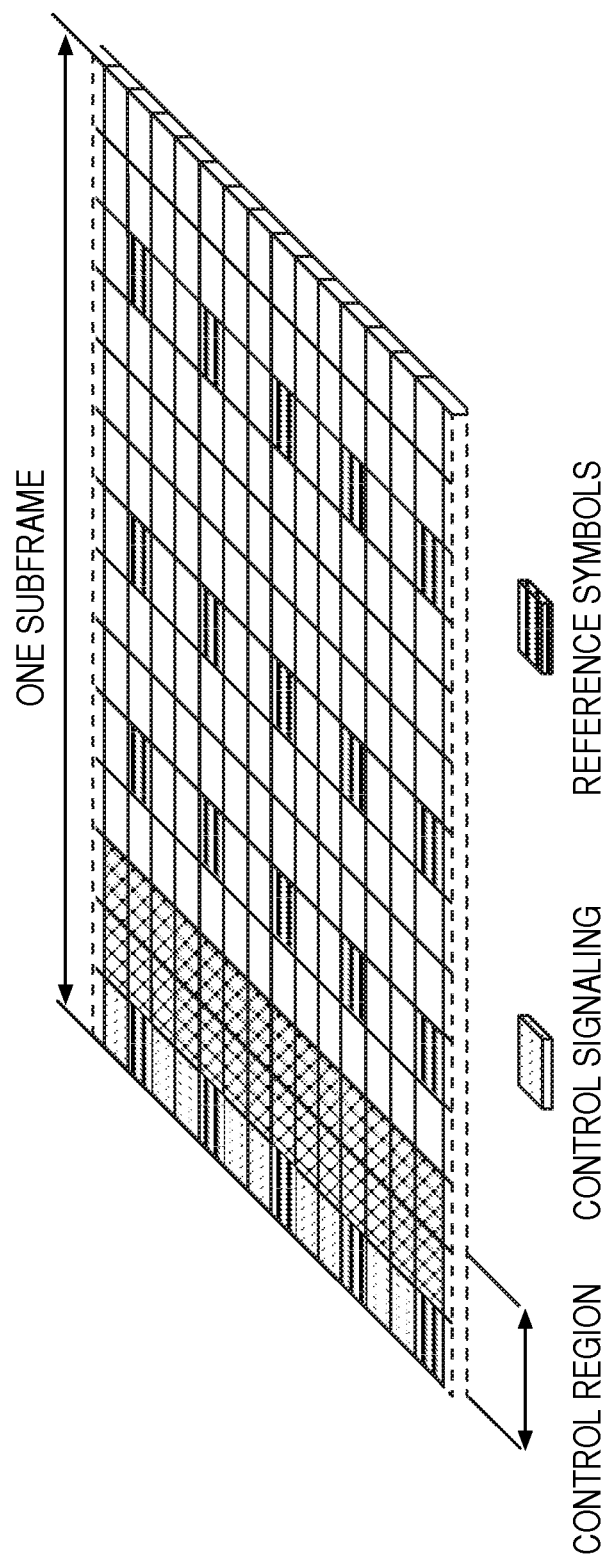
FIG. 4 illustrates an exemplary downlink subframe such as is used in the LTE communications network that illustrates a relationship between a subframe, control signaling, and reference symbols, according to some embodiments of the current disclosure.

Downlink (DL) transmissions are dynamically scheduled, i.e., in each subframe the base station transmits control information about to which terminals data is transmitted and upon which resource blocks the data is transmitted, in the current downlink subframe. This control signaling is typically transmitted in the first one, two, three, or four OFDM symbols in each subframe. A downlink system with three OFDM symbols as control is illustrated in FIG. 4.

Figure 5:
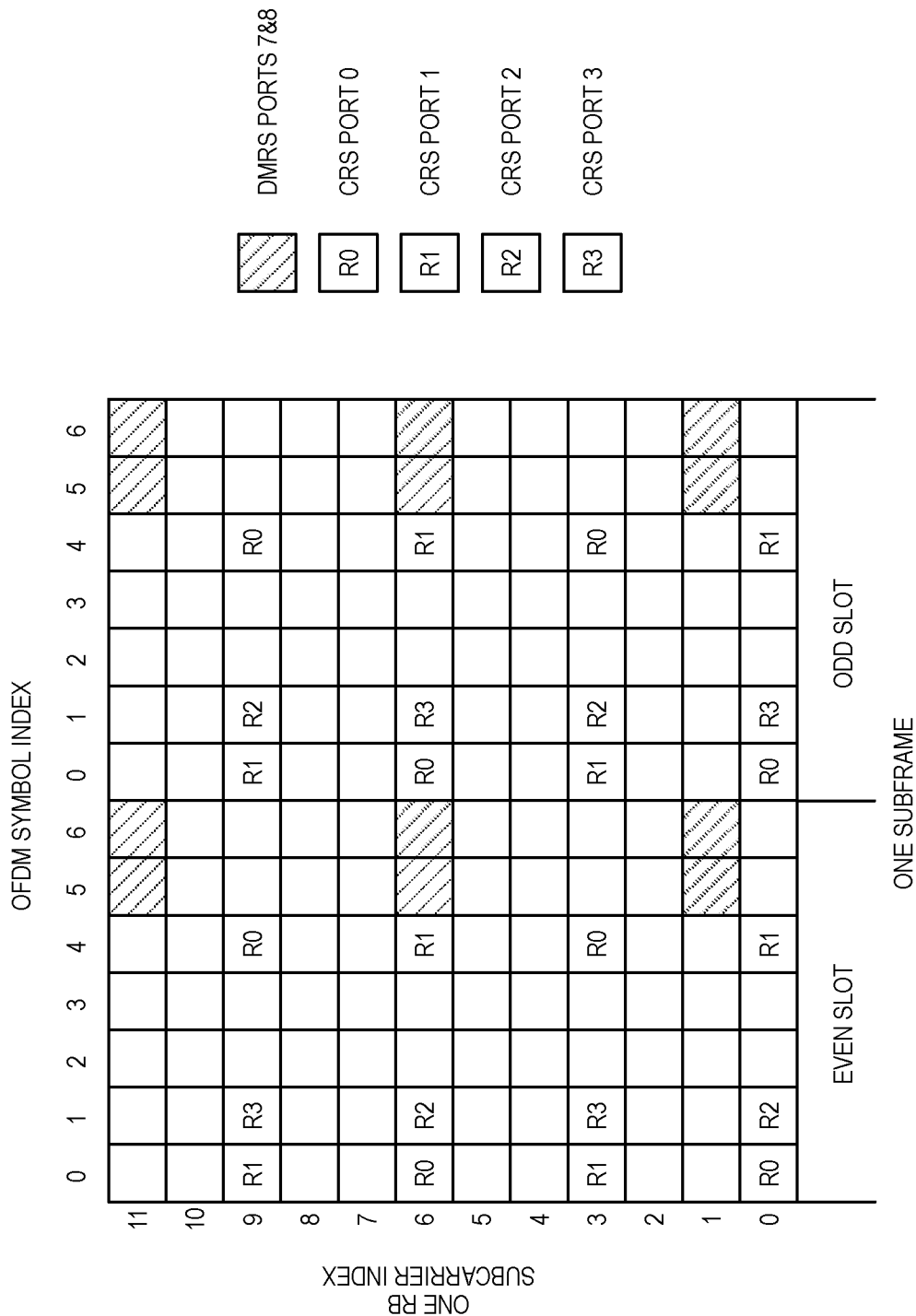
FIG. 5 illustrates a Cell specific Reference Signal (CRS) and Demodulation Reference Signal (DMRS) pattern in LTE according to some embodiments of the present disclosure.

One DL Reference Signal (RS) type is a Cell specific Reference Signal (CRS). CRSs are transmitted in every subframe and over the entire frequency band. Up to four CRS ports are supported. CRSs are transmitted on a grid of Resource Elements (REs) in each PRB and are mainly used for downlink channel estimation purpose. An example of the CRS RE locations in a PRB is shown in FIG. 5. The frequency locations of the CRS REs are cell dependent and may be shifted for cells with different physical cell Identifiers (IDs).

Demodulation Reference Signal (DMRS) is also used for downlink channel estimation and demodulation for certain transmission modes, such as transmission modes 9 and 10. Unlike CRS, DMRS is UE specific, i.e. it is only transmitted when there is DL data transmission to a UE and in those PRBs where the Physical Downlink Shared Channel (PDSCH) is transmitted. There are eight DMRS ports (ports 7 to 14) defined in LTE and thus up to eight layers of PDSCH data can be supported. For UEs with a single layer transmission, either port 7 or port 8 can be used. The DMRS port used is dynamically indicated in the associated Physical Downlink Control Channel (PDCCH) or Enhanced PDCCH (EPDCCH). The DMRS ports are transmitted on certain fixed REs within a PRB. The RE pattern for port 7 and port 8 are shown in FIG. 4. Ports 7 and 8 occupy the same set of REs in a PRB and the two ports are multiplexed by using Orthogonal Cover Codes (OCC). DMRS is precoded with the same precoder as the data so when the UE has estimated the channel from DMRS, it can directly use the channel estimate for PDSCH demodulation without knowing the precoder. Therefore, the precoder is transparent to the UE and thus theoretically, the eNB is free to use any precoder.

In LTE downlink, Channel State Information (CSI) Reference Signals (CSI-RS) were introduced in Release 10 for UEs to estimate the downlink channel and feedback CSI, which typically consists of a rank indicator (RI), a channel quality indicator (CQI) and a precoding matrix indicator (PMI). CSI reference signals are transmitted on one, two, four, eight, twelve, sixteen, twenty, twenty-four, twenty-eight and thirty-two antenna ports with port numbers p=15, p=15, 16, p=15, . . . , 18, p=15, . . . , 22, p=15, . . . , 26, p=15, . . . , 30, p=15, . . . , 34, p=15, . . . , 38, p=15, . . . , 42, p=15, . . . , 46, respectively.

Figure 6B:
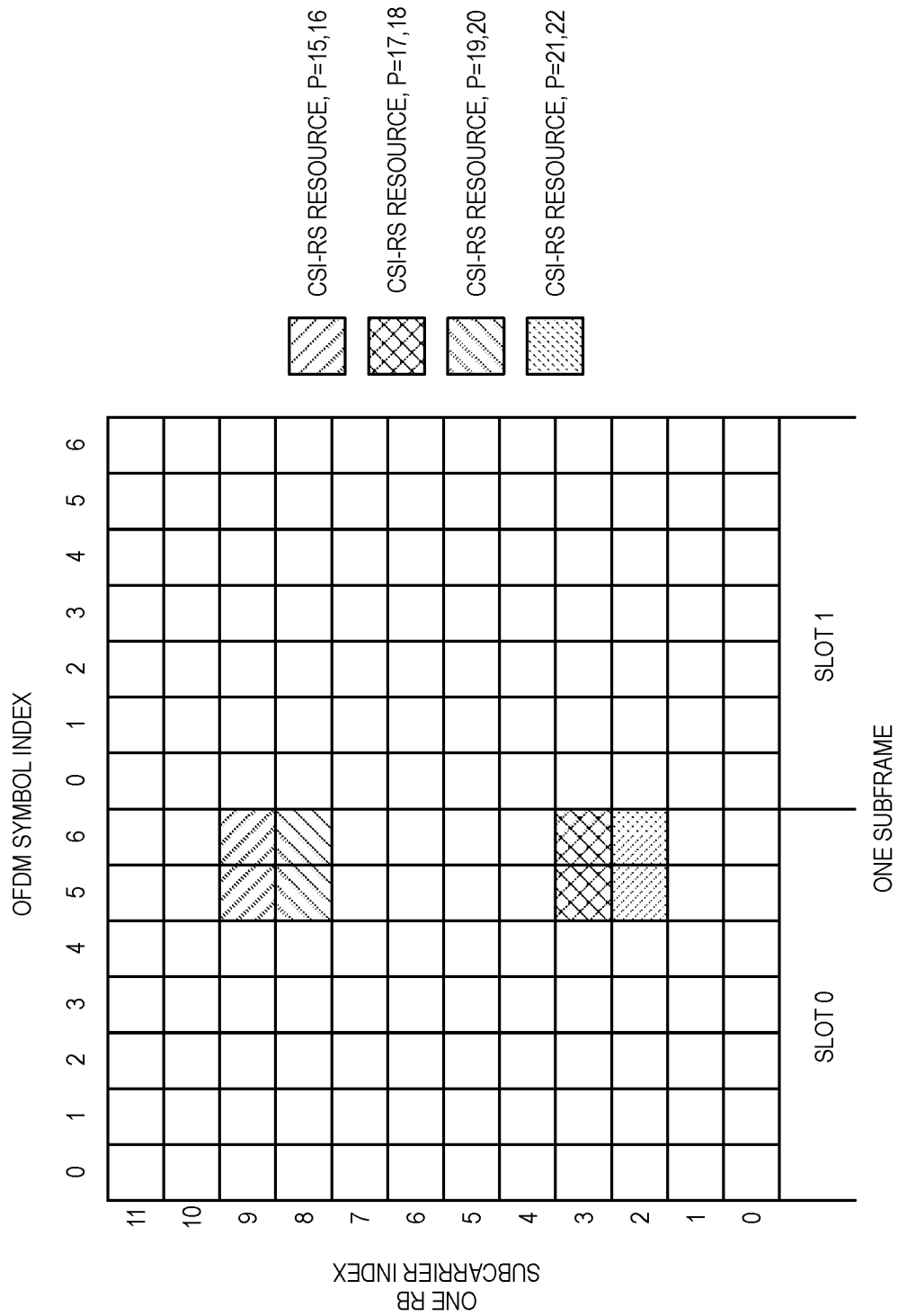

FIG. 6A shows the REs available in the PRB pair for transmitting CSI-RS; there are a total of 40 REs per PRB pair that are available for configuring CSI-RS. For up to eight CSI-RS ports, CSI-RS for each antenna port is mapped to two REs on the same subcarrier and two adjacent OFDM symbols; the two REs are shared by CSI-RS for the two antenna ports. Length two orthogonal cover codes (OCC2) are used across the two REs so that the two CSI-RS signals can be separated at a UE. An eight-port CSI-RS example is shown in FIG. 6B. Different CSI-RS patterns are available. For example, there are five configurations for eight-port CSI-RS, ten configurations for four-port CSI-RS, and more configurations for two-port CSI-RS.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO. In LTE, different types of MIMO transmission modes are supported including closed-loop spatial multiplexing, open-loop spatial multiplexing, transmit diversity, semi-open-loop spatial multiplexing.

Figure 7:
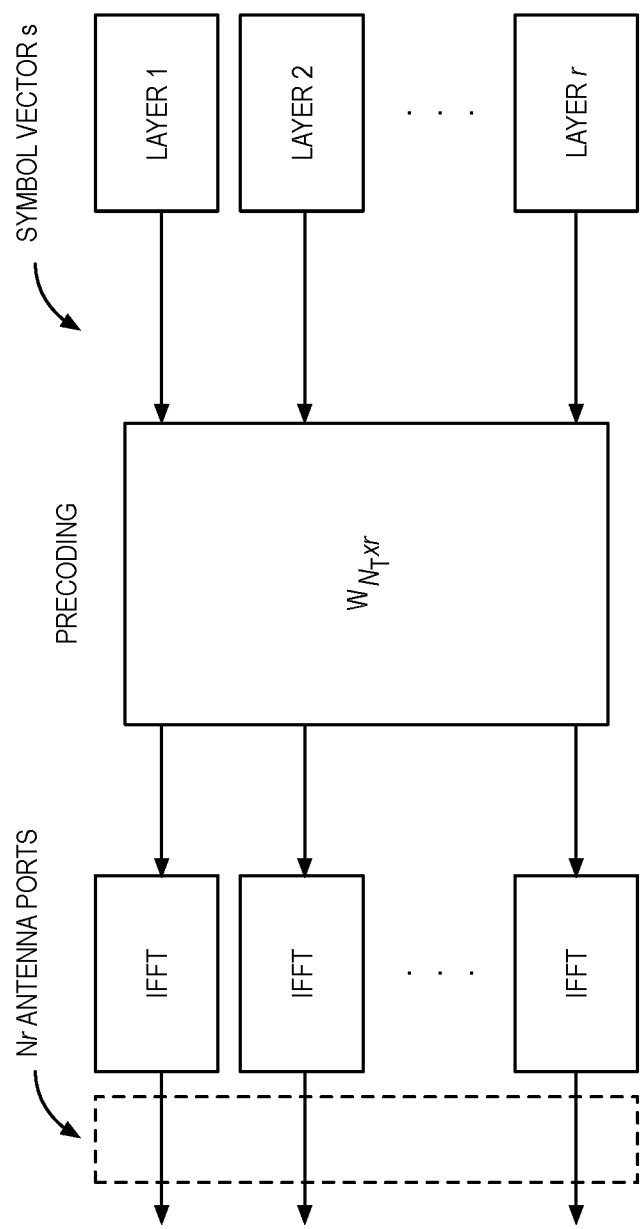
FIG. 7 illustrates a transmission structure of precoded spatial multiplexing mode in LTE according to some embodiments of the present disclosure.

The LTE standard is currently evolving with enhanced MIMO support. A core component in LTE is the support of MIMO antenna deployments and MIMO related techniques. Currently LTE supports up to eight-layer spatial multiplexing with channel dependent precoding. The spatial multiplexing mode is aimed for high data rates in favorable channel conditions. An illustration of the spatial multiplexing operation is provided in FIG. 7.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element. The number of symbols r is typically adapted to suit the current channel properties.

LTE uses OFDM in the downlink (and DFT precoded OFDM in the uplink) and hence the received $N_R \times 1$ vector $y_n$, for a certain RE on subcarrier n is thus modeled by:

$$y_n = H_n W s_n + e_n$$

where $e_n$ is a noise/interference vector obtained as realizations of a random process. The precoder, W, can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. By measuring on CRS or CSI-RS, a UE can estimate the number of spatially multiplexed layers, or transmission rank, the precoder W, and the modulation level and coding rate. These quantities are reported back by the UE as channel state information (CSI).

This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder W. For efficient performance, it is important that a transmission rank that matches the channel properties is selected.

Open Loop (OL) transmission is also supported in LTE, in which the precoder is predetermined and is not from UE feedback. OL transmission is useful in situations where the precoder W is not reliable. For example, the channel is changing too fast due to high UE mobility. In LTE, OL transmission is only supported for two and four antenna ports and is for CRS based transmission only.

Semi-open-loop transmission was introduced in LTE Rel-14. The motivation was to provide more robust transmission for high mobility UEs when a large number of antenna ports are deployed, in which the antenna beam formed by a feedback precoder becomes narrow. It has been agreed that for rank=1 transmission, SFBC (space frequency block coding) based transmit diversity will be used based on DMRS ports 7 and 8. The idea was that two beams will be formed, one over DMRS port 7 and the other over DMRS port 8. The two beams would provide a better coverage for a UE with high mobility. Then the scheduled data (or modulation symbols), $\{d(0), d(1), d(M_{symb}-1)\}$, are sent on both DMRS port 7 and port 8 as described mathematically below:

$$\begin{bmatrix} y^{(7)}(2i) \\ y^{(8)}(2i) \\ y^{(7)}(2i+1) \\ y^{(8)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix}$$

where $x^{(v)}(i)$ ($i=0, 1, \ldots, M_{symb}^{layer}-1$) is the $i^{th}$ complex-valued modulation symbol of layer $v \in \{0, 1\}$, and $x^{(0)}(i)=d(2i)$, $x^{(1)}(i)=d(2i+1)$, and $M_{symb}^{layer}=M_{symb}/2$. $y^{(p)}(i)$ represents the $i^{th}$ symbol to be transmitted over antenna port $p \in \{7, 8\}$.

This is the well-known Alamouti coding, in which the signals on each antenna port are transmitted in pairs, i.e. $\{y^{(p)}(2i), y^{(p)}(2i+1)\}$. There was an underlying assumption that the channels over which $\{y^{(p)}(2i), y^{(p)}(2i+1)\}$ are transmitted should be the same. In the original Alamouti coding case, $\{y^{(p)}(2i), y^{(p)}(2i+1)\}$ are transmitted in consecutive time instances to ensure the channel is unchanged. This is often referred as Space Time Block Coding (STBC). In LTE, it has been agreed that $\{y^{(p)}(2i), y^{(p)}(2i+1)\}$ are mapped to two REs in two subcarriers, also referred to as Space Frequency Block Coding (SFBC). However, SFBC requires even number of REs in each OFDM symbols in the scheduled PRB pairs, which is not always the case. As shown in FIG. 5, there are nine available REs in each of OFDM symbols 5 and 6. In addition, if one or two CSI-RS ports are configured in OFDM symbols 2 and 3 in slot 1, then the number of available REs is also not even.

Figure 8:
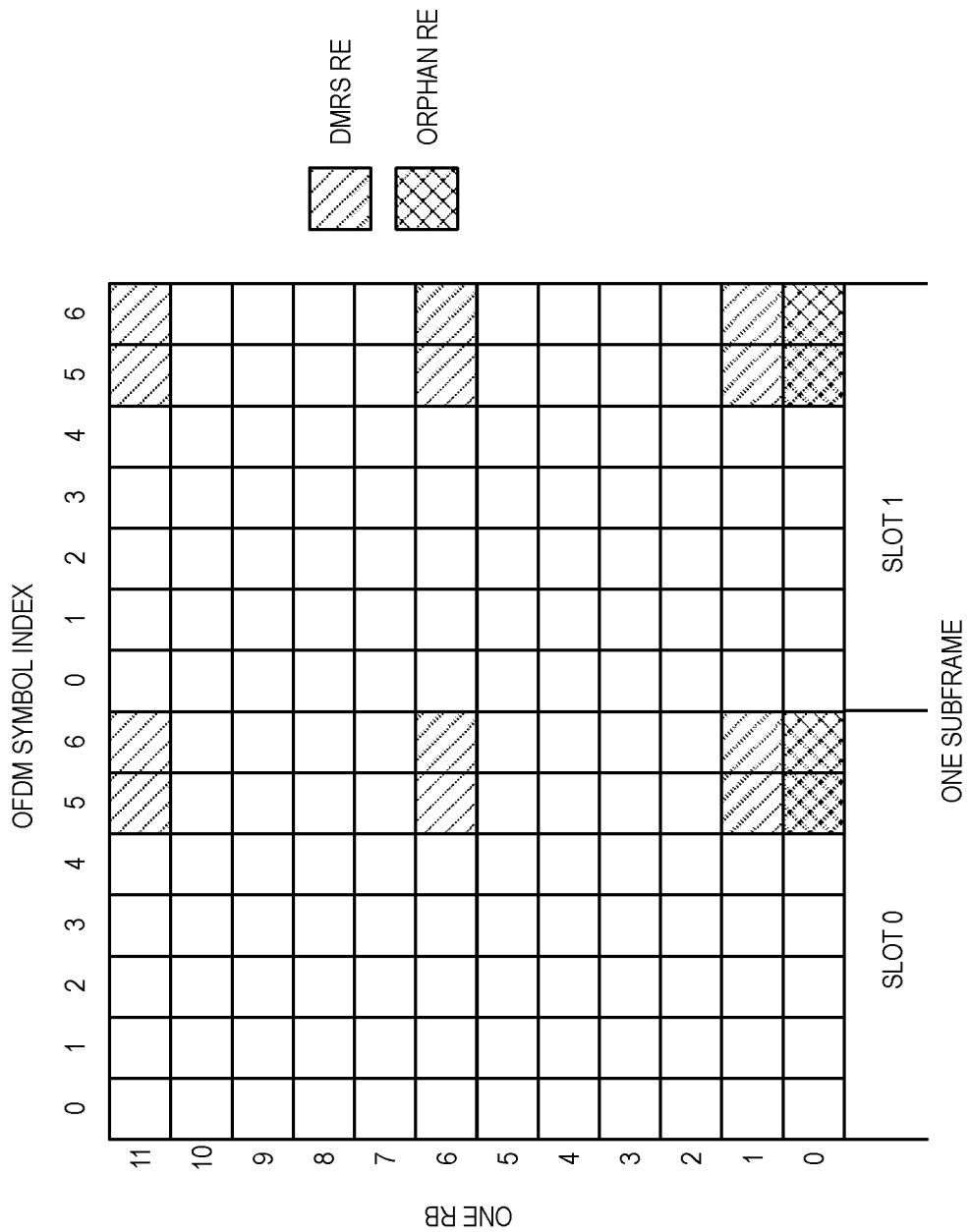
FIG. 8 illustrates orphan Resource Elements (REs) where an orphan RE is an RE that would not have another RE to be paired with and could not be used according to the scheme being used, according to some embodiments of the present disclosure.

To solve the problem, a number of solutions are possible as follows:

Option A: One "orphan" RE per allocated RB. This option is illustrated in FIG. 8, in which one RE per OFDM symbol containing DMRS is unused as an orphan RE. So four REs per RB are not used for data mapping in FIG. 8.

Option B: One "orphan" RE in the last allocated RB (if number of allocated RB is odd) is unused. In this option, $\{y^{(p)}(2i), y^{(p)}(2i+1)\}$ is allowed to be mapped across two RBs, so only four REs in the last RB would be unused if odd number of RBs are scheduled. Comparing to Option A, there would be a smaller number of unused REs. This option, however, requires contiguous RB allocation. Otherwise, $\{y^{(p)}(2i), y^{(p)}(2i+1)\}$ could be mapped to non-adjacent RBs, over which the channels could be quite different.

Option C: One "orphan" RE in the last allocated RB of every block of continuous RB allocation with an odd number of RB pairs is unused. In this option, $\{y^{(p)}(2i), y^{(p)}(2i+1)\}$ are mapped to only continuous RB pairs. When multiple contiguous RB pairs are allocated, four REs would be unused in each contiguous RB block if the number of RB pairs in the block is odd. Comparing to Option B, there could be more unused REs.

As used herein, an "orphan" RE is an RE that would not have another RE to be paired with and could not be used according to the scheme being used.

Figure 9A:
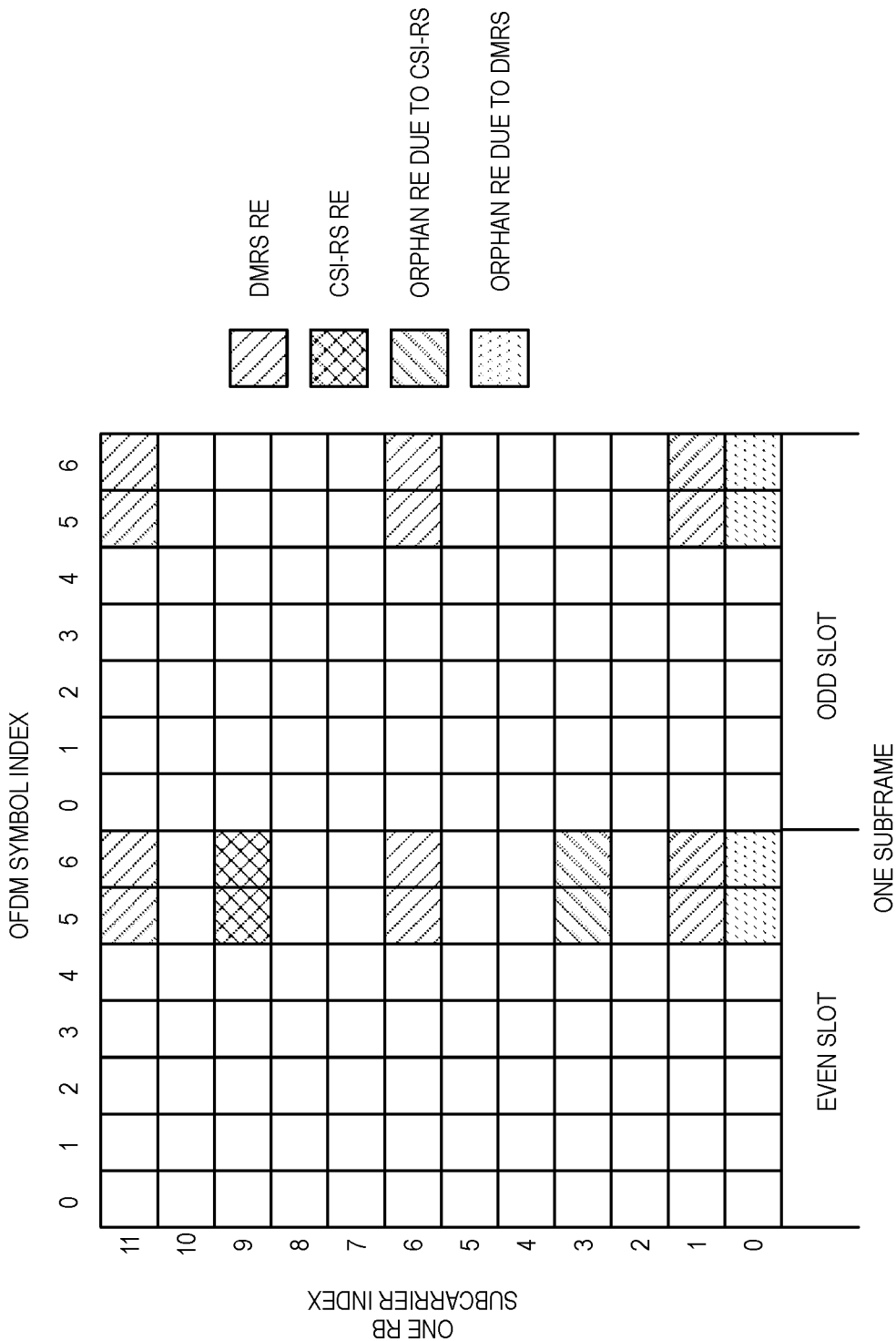
FIGS. 9A and 9B illustrate examples of orphan REs for one or two CSI-RS ports according to some embodiments of the present disclosure.
Figure 9B:
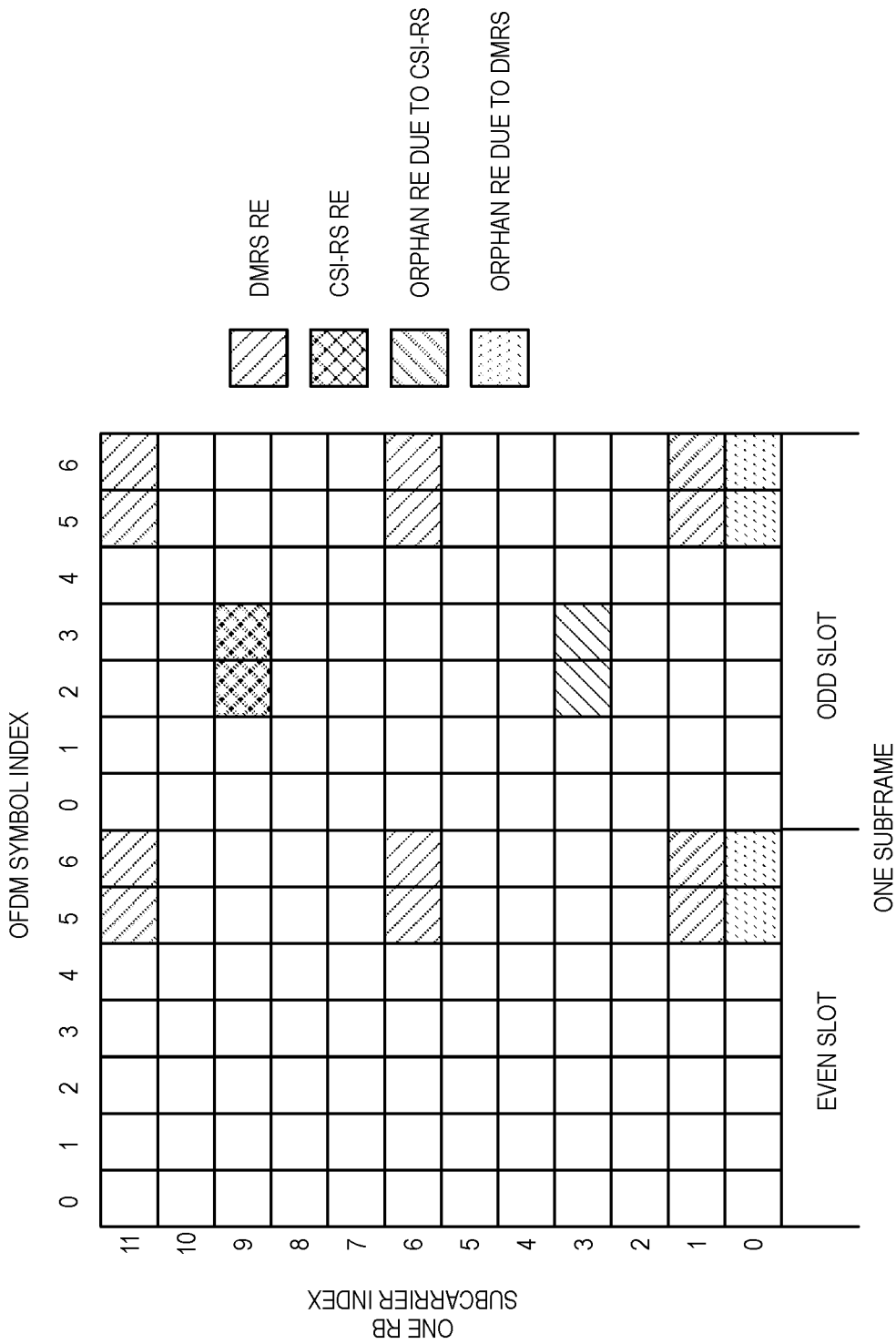

In addition, it was suggested that if one or two CSI-RS ports are configured, then for $\{y^{(p)}(2i), y^{(p)}(2i+1)\}$ mapping purpose, they would be treated as four CSI-RS ports, i.e. the corresponding four REs are not used. An example is shown in FIGS. 9A and 9B.

Spatially multiplexed semi-open loop transmission with rank=2 is also supported in LTE Rel-14, where RE-level precoder cycling for PDSCH transmission using DMRS ports 7 and 8 varies with modulation symbol i, and can be expressed:

$$\begin{bmatrix} y^{(7)}(i) \\ y^{(8)}(i) \end{bmatrix} = \begin{bmatrix} 1 & 1 \\ \varphi_n & -\varphi_n \end{bmatrix} \begin{bmatrix} x^{(0)}(i) \\ x^{(1)}(i) \end{bmatrix}, \varphi_n = e^{j\pi \bmod(i,2)/2}$$

Or equivalently:

$$\begin{bmatrix} y^{(7)}(i) \\ y^{(8)}(i) \end{bmatrix} = \begin{bmatrix} 1 & 1 \\ 1 & -1 \end{bmatrix} \begin{bmatrix} x^{(0)}(i) \\ x^{(1)}(i) \end{bmatrix} \text{ for even values of } i$$

-continued $$\begin{bmatrix} y^{(7)}(i) \\ y^{(8)}(i) \end{bmatrix} = \begin{bmatrix} 1 & 1 \\ -1 & 1 \end{bmatrix} \begin{bmatrix} x^{(0)}(i) \\ x^{(1)}(i) \end{bmatrix} \text{ for odd values of } i$$

In this case, there are two data streams $\{d^{(0)}(i), i=0, 1, \ldots, M_{symb}-1\}$ and $\{d^{(1)}(i), i=0, 1, \ldots, M_{symb}-1\}$ each is mapped to one layer, i.e. $x^{(0)}(i)=d^{(0)}(i)$ and $x^{(1)}(i)=d^{(1)}(i)$. This use of two different precoding matrices for odd and even values of i means that the effective antenna pattern varies for odd and even precoded modulation symbols. Since there are then two sets of precoding used, the interference produced to a victim UE on a given resource element depends on which precoding matrix was used to produce the interference on the resource element. If a victim UE knows the set of resource elements correspond to the first precoding matrix and the set of resource elements corresponding to the second precoding matrix, it can use interference suppression parameters matched to the proper precoding matrices. For example, one set of Minimum Mean Square Error Interference Rejection Combining (MMSE-IRC) weights could be applied to the REs corresponding to the first precoding matrix and a second set of MMSE-IRC combining weights could be applied to the REs corresponding to the second precoding matrix. If the UE has four receive antennas, then it can suppress up to two layers of interference while receiving two desired layers of data with an MMSE-IRC receiver. Transmission on ports 7 and 8 comprises two layers. Therefore, while receiving REs corresponding to one precoding matrix, the UE can suppress two layers of interference. However, if the UE is not aware of which REs correspond to the two precoding matrices, the UE must form an average of the interference over all REs, resulting in a linear combination of the differently precoded interference, which will generally appear as four layers. Since CSI-RS may or may not be configured for an interfering UE, or three or six REs may be present in an OFDM symbol for the interfering RE, a victim UE does not know which REs carry PDSCH. Because REs are mapped frequency-first (that is, adjacent precoded modulation symbols are first mapped to adjacent subcarriers, and then to OFDM symbols), the UE consequently does not know which precoding matrix a given RE corresponds to. Therefore, interference must be averaged over REs, and consequently appears as being transmitted on more layers than it actually is.

Figure 10:
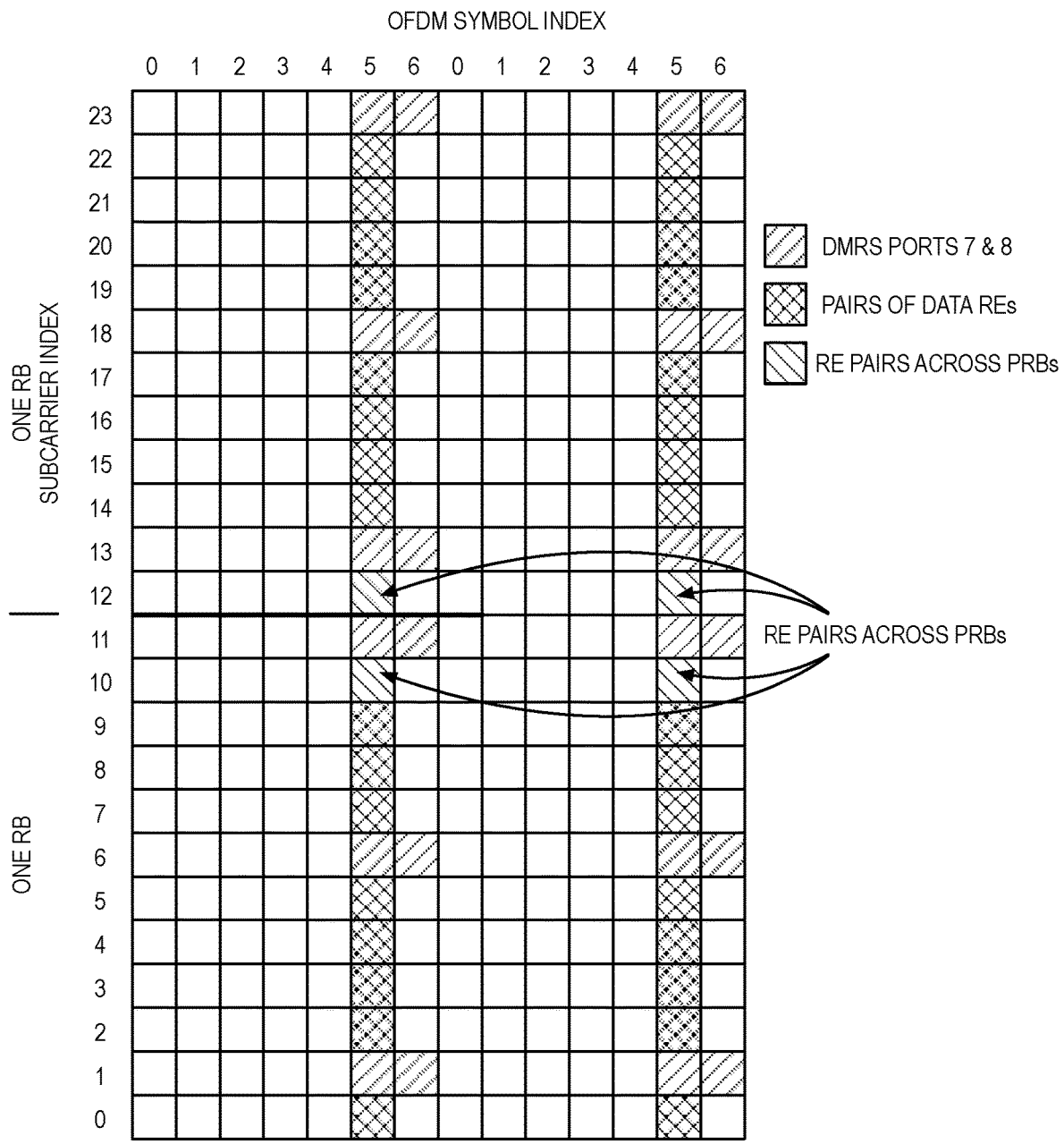
FIG. 10 illustrates an issue with an RE pair across two RBs according to some embodiments of the present disclosure.

With option A, four REs would be wasted in each RB pair, which is equivalent to about 4% of overhead in LTE. Option B is more efficient in resource utilization but requires contiguous RB allocations for a UE. Otherwise, the frequency separation of REs for $\{y^{(p)}(2i), y^{(p)}(2i+1)\}$ would be more than a PRB, which is too large for SFBC and may result in the orthogonality of the SFBC being compromised. Option C allows non-contiguous PRB allocations for a UE. However, as shown in FIG. 10, for a pair of REs across two RBs, both Option B and option C require the same DMRS precoder over the two RB pairs. Otherwise, the equivalent channels for the two symbols transmitted over the two REs would be different, which would violate the Alamouti coding requirement. On the other hand, using the same precoder for all adjacent RBs is too restrictive and would prevent using precoder cycling across scheduled RBs, i.e. using different precoders in different RBs or RB groups, to further improve diversity. In summary, the existing solutions may have the following drawbacks:

Option A would incur about 4% of overhead
Option B would require contiguous PRB allocation for a UE
Both Option B and Option C would require the same precoder over adjacent PRBs, which can be too restrictive
Additional "orphan" REs in a subframe containing one or two ports CSI-RS Systems and methods for mixed space time and space frequency block coding are provided. In some embodiments, a method of operating a first node with multiple transmit antennas in a wireless communication network for providing time and frequency diversity includes precoding modulation symbols intended for a second node according to two antenna ports (i.e. two DMRS ports) on which they are to be transmitted. In a first subset of OFDM symbols, mapping the precoded modulation symbols to resource elements starting first with indices corresponds to frequency. In a different subset of OFDM symbols, mapping the precoded modulation symbols to resource elements in any two adjacent OFDM symbols starting first with indices corresponds to time. In this way, transmission efficiency may be increased by not having any resource elements unused. Additional flexibility for precoding may also be provided when there is no symbol pair mapped to resource elements across two resource blocks.

In some embodiments, a solution for the orphan RE problem is as follows:

(a) For each antenna port, the block of complex-valued symbols $\{y^{(p)}(0), y^{(p)}(1), \ldots, y^{(p)}(M_{symb}^{layer}-1)\}$ are mapped in sequence starting with y(p) (0) to resource element (k,l) on antenna port $p \in \{7,8\}$ and not reserved for other purposes such as CRS in increasing order of first the index k over the assigned RBs and then index l, starting with the first slot in a subframe, where k is the subcarrier index and $l \in \{0,1,\ldots,6\}$ the OFDM symbol index. This applies to OFDM symbols not containing DMRS or CSI-RS. SFBC is used in these OFDM symbols.

(b) In OFDM symbols containing DMRS and/or CSI-RS, symbol pair $\{y^{(p)}(2i), y^{(p)}(2i+1)\}$ are mapped to REs in adjacent OFDM symbols, i.e. $\{(k,l), (k,l+1)\}$ in increasing order of first the index k over the assigned RBs and then index l. STBC is used in these OFDM symbols.

Figure 11B:
Figure 12B:
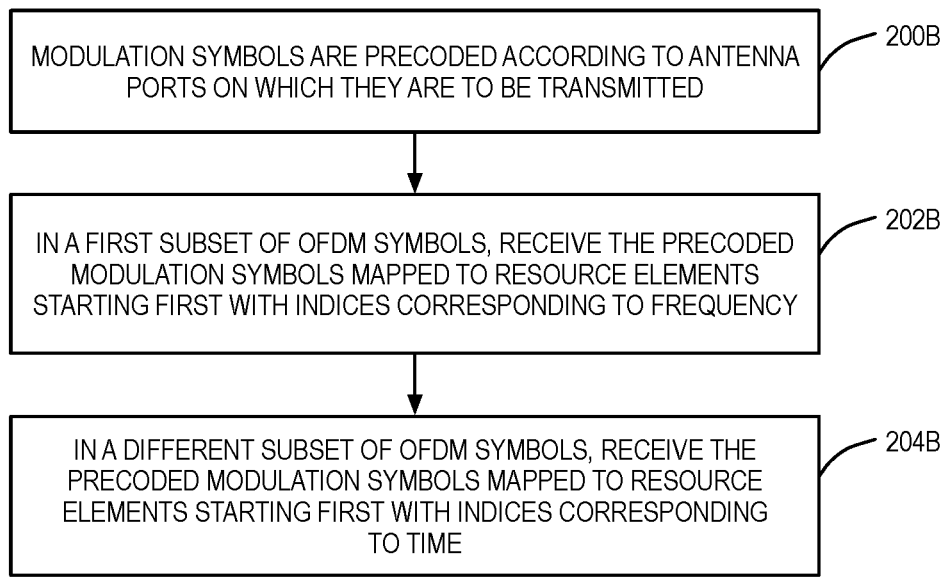

FIGS. 11A through 13A illustrate procedures for mapping symbols to resource elements according to some embodiments of the present disclosure. Specifically, FIG. 11A illustrates a first node transmitting a physical channel using a mixed SFBC and STBC (step 100A). In some embodiments, this is accomplished by performing the method as described in FIG. 12A. In this case, the first node precodes modulation symbols according to antenna ports on which they are to be transmitted (step 200A). Then, in a first subset of OFDM symbols, the first node maps the precoded modulation symbols to resource elements starting first with indices corresponding to frequency (step 202A). In a different subset of OFDM symbols, the first node maps the precoded modulation symbols to resource elements starting first with indices corresponding to time (step 204A).

Figure 13A:
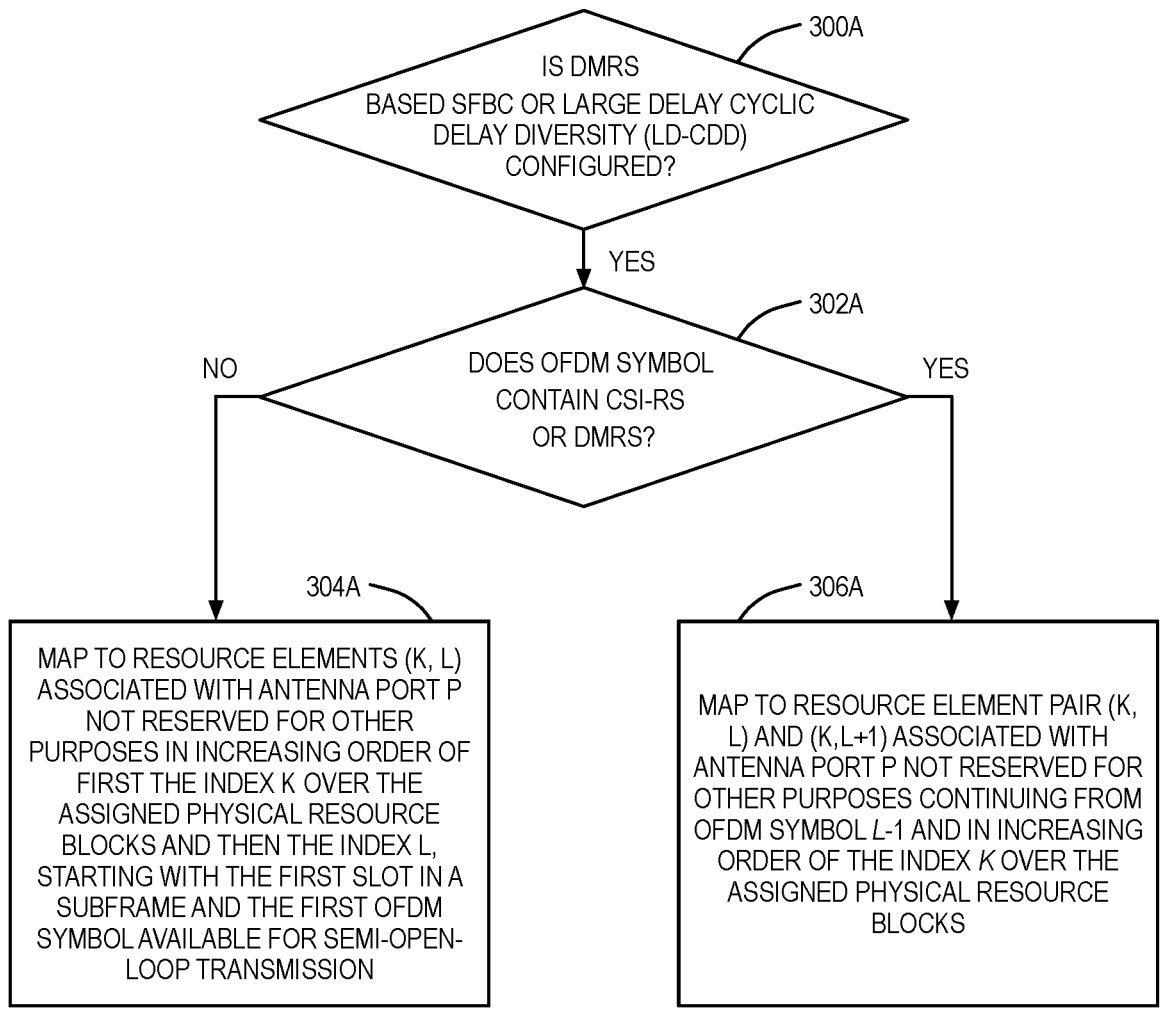
Figure 13B:
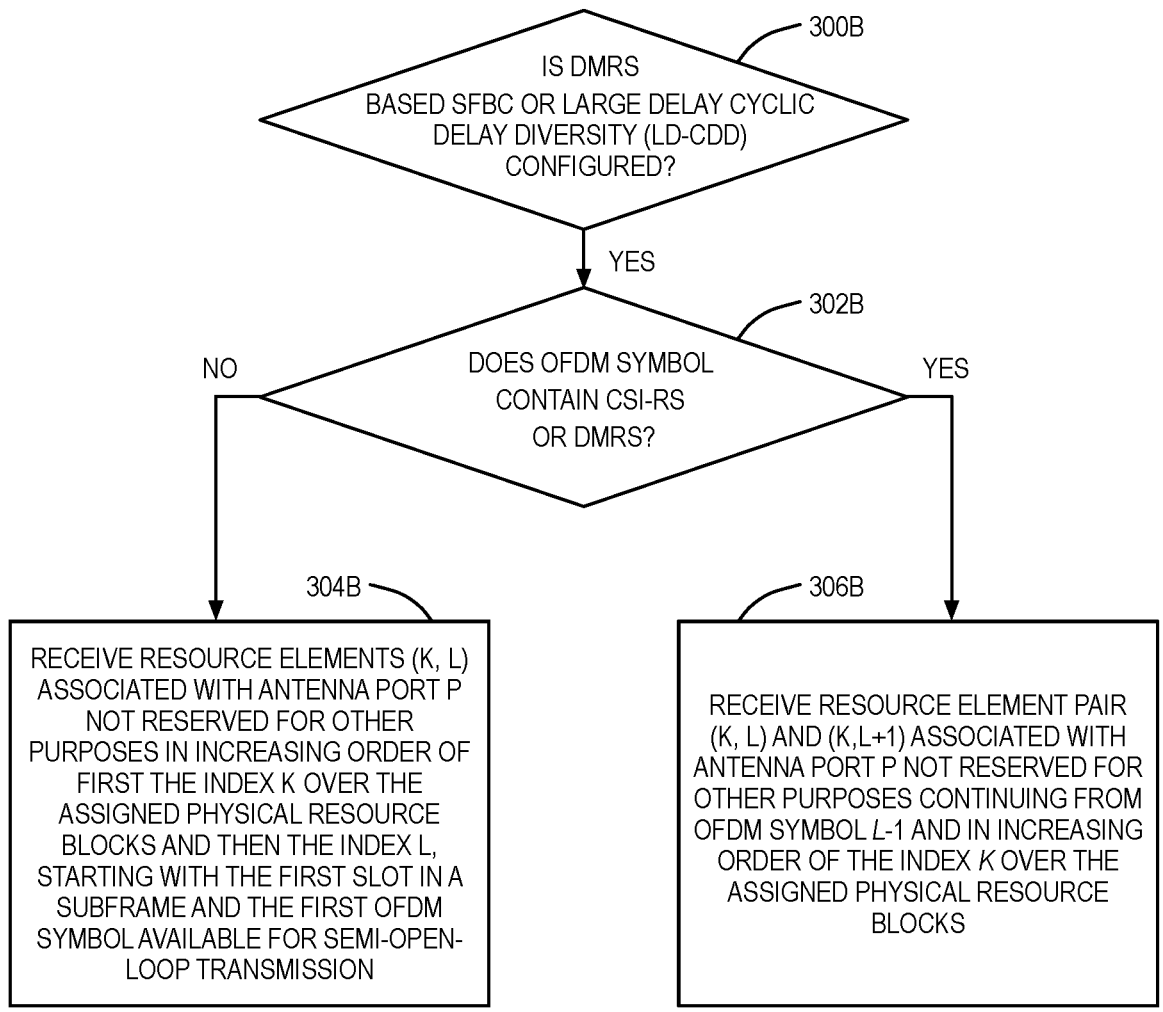

FIG. 13A illustrates a procedure that begins with checking whether DMRS based SFBC or LD-CDD is configured (step 300A). If either is configured, the first node then checks each OFDM symbol/to determine if it contains a CSI-RS or a DMRS (step 302A). If it does not contain either, then the first node maps the OFDM symbol to resource elements (k,l) associated with antenna port p not reserved for other purposes in increasing order of first the subcarrier index k over the assigned physical resource blocks and then the OFDM symbol index l, starting with the first slot in a subframe and the first OFDM symbol available for semi-open-loop transmission (step 304A). However, if OFDM symbols/and l+1 do contain a CSI-RS or a DMRS, the first node maps the OFDM symbol pair $\{y^{(p)}(2i), y^{(p)}(2i+1)\}$ to resource element pair (k,l) and (k,l+1) associated with antenna port p not reserved for other purposes continuing from OFDM symbol l−1 and in increasing order of the index k over the assigned physical resource blocks (step 306A).

FIGS. 11B-13B, are figures illustrating analogous operation at a receiving side such as second node 14.

Figure 14:
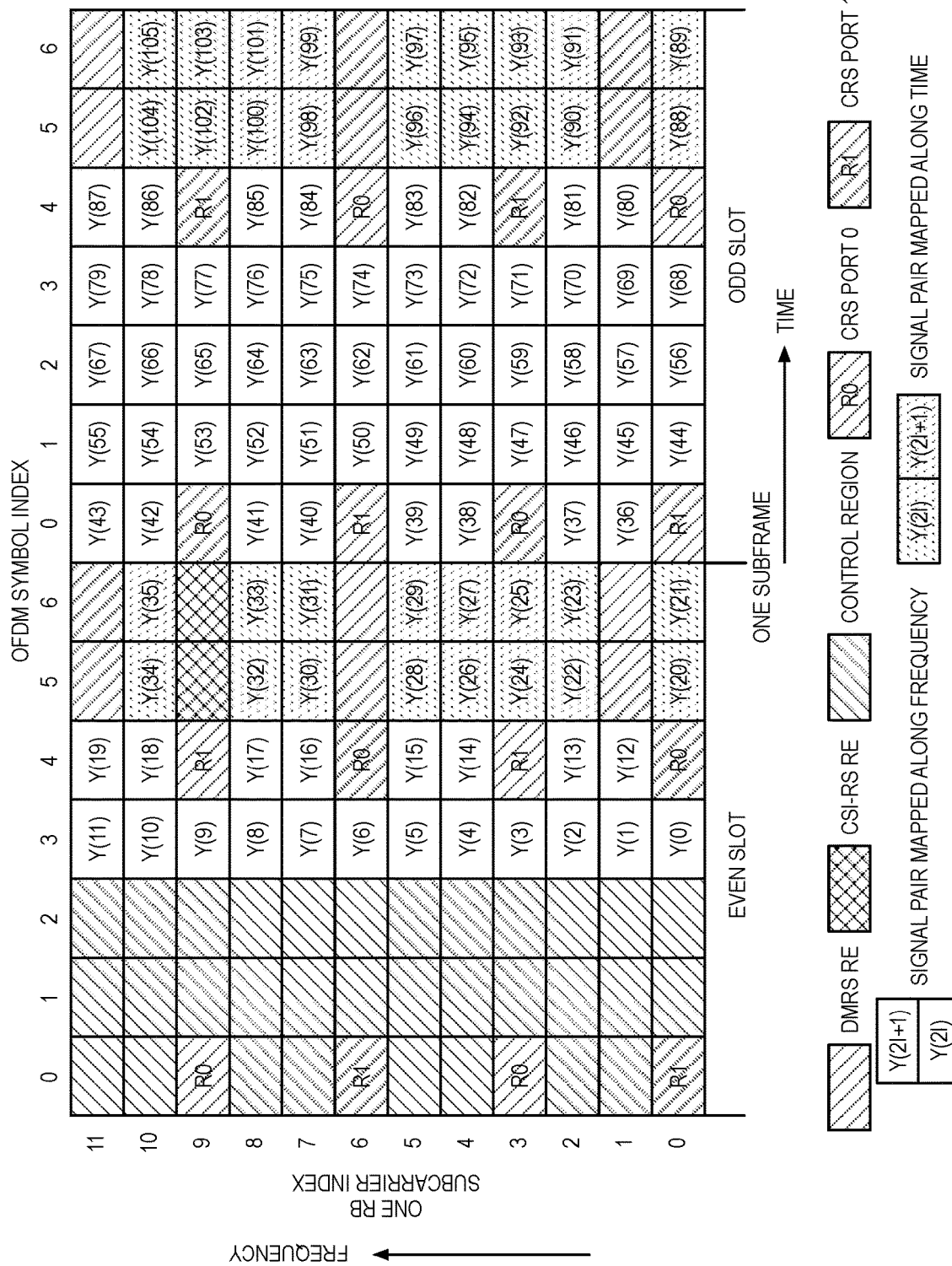
FIG. 14 illustrates example of mapping $\{y^{(p)}(2i), y^{(p)}(2i+1)\}$ to REs in OFDM symbols containing DMRS and/or CSI-RS in adjacent OFDM symbols according to some embodiments of the present disclosure.

An example is shown in FIG. 14, in which symbol pairs $\{y(2i),y(2i+1)\}$ on either DMRS port 7 or 8 are mapped in adjacent OFDM symbols, instead of subcarriers, in the OFDM symbols containing DMRS and/or CSI-RS. Since the channel generally does not change over two adjacent OFDM symbols, the diversity performance is retained with this mapping.

Comparing FIG. 14 and FIG. 15 to FIGS. 9A and 9B where six orphan REs are unused, about 5.7% more data can be transmitted with the proposed solution, which would result in at least 5.7% of user throughput gain. Even for the case of more than two CSI-RS ports, the solution would lead to at least 3.8% user throughput gain. Furthermore, there is no restriction on precoders for the DMRS ports in each scheduled PRB.

Figure 15:
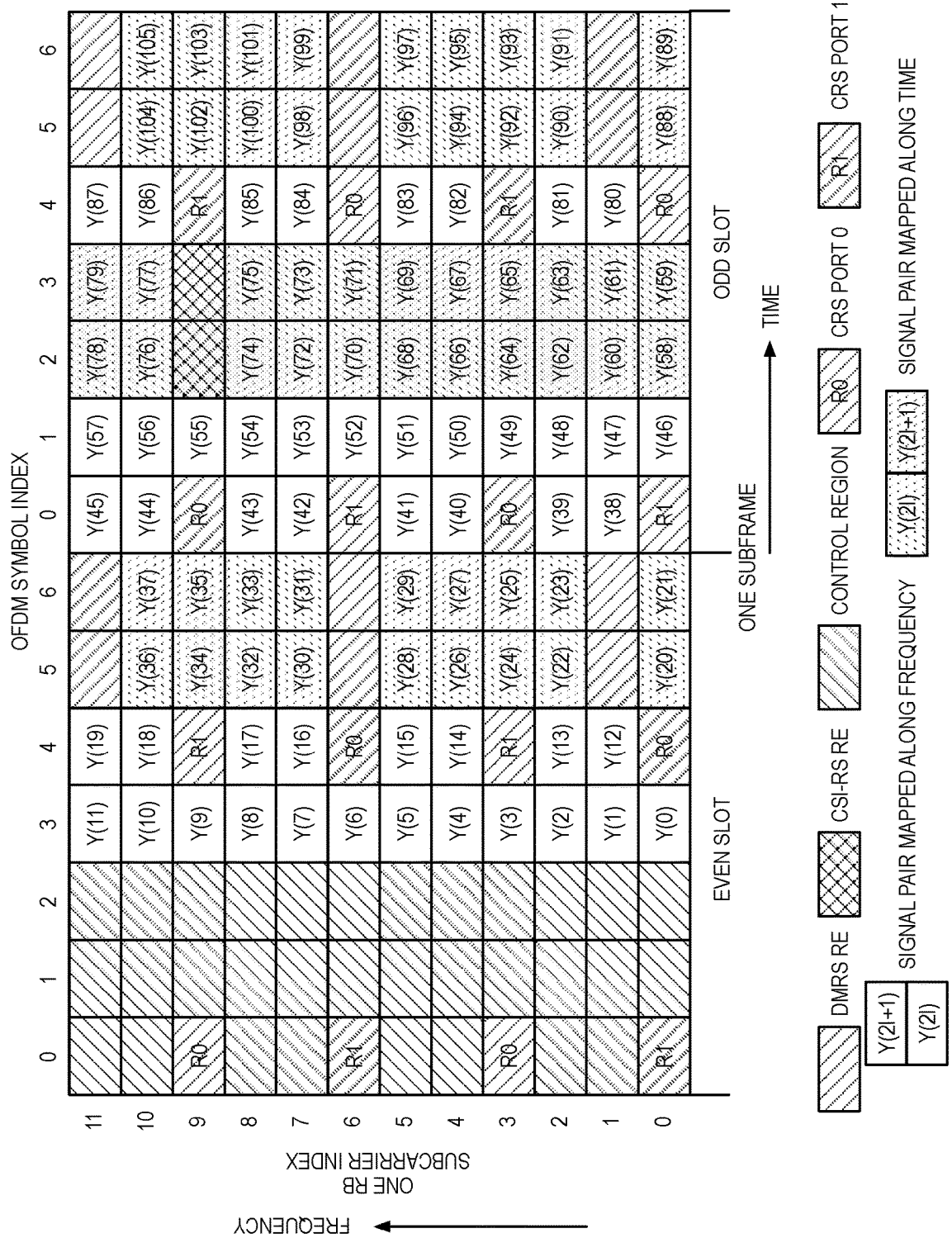
FIG. 15 illustrates another example of mapping $\{y^{(p)}(2i), y^{(p)}(2i+1)\}$ to REs in OFDM symbols containing DMRS and/or CSI-RS in adjacent OFDM symbols according to some embodiments of the present disclosure.

At the second node 14, when it is indicated that there is a PDSCH transmission with semi-open-loop in a subframe, the UE would extract the signals received on each of the RE pairs according to the embodiment illustrated in FIG. 14 to FIG. 15. The received signals over each RE pair are then:

$$z(2i)=h_1(2i)y^{(7)}(2i)+h_2(2i)y^{(8)}(2i)+n(2i)$$

$$z(2i+1)=h_1(2i+1)y^{(7)}(2i+1)+h_2(2i+1)y^{(8)}(2i+1)+n(2i+1)$$

where $h_1(2i)$ and $h_2(2i)$ are the channels from antenna ports 7 and 8, respectively, to the UE receive antenna at the RE carrying $\{y^{(7)}(2i), y^{(8)}(2i)\}$; Similarly, $h_1(2i+1)$ and $h_2(2i+1)$ are the channels at the RE carrying $\{y^{(7)}(2i+1), y^{(8)}(2i+1)\}$. It is assumed that $h_1(2i)=h_1(2i+1)$ and $h_2(2i)=h_2(2i+1)$, i.e., the channel does not change over the two REs. $\{n(2i),n(2i+1)\}$ are the receiver noise at the pair of REs. The result is:

$$z(2i)=h_1(2i)y^{(7)}(2i)+h_2(2i)y^{(8)}(2i)+n(2i)$$

$$z(2i+1)=h_1(2i)y^{(7)}(2i+1)+h_2(2i)y^{(8)}(2i+1)+n(2i+1)$$

The modulation symbols carried over $\{y^{(7)}(2i), y^{(8)}(2i), y^{(7)}(2i+1), y^{(8)}(2i+1)\}$ over the pair of REs can be then estimated as:

$$\hat{x}^{(0)}(i)=\alpha[h^*_1(2i)z(2i)+h_2(2i)z^*(2+1)]$$

$$\hat{x}^{(1)}(i)=\beta[h^*_1(2i)z(2i+1)-h_2(2i)z^*(2i)]$$

where α and β are scaling constants.

A general solution allowing both better interference suppression and avoidance of the orphan RE problem is to change the RE mapping such that when either transmit diversity is configured or when RE level precoder cycling (also known as LD-CDD) is configured. The new RE mapping is such that the precoded modulation symbols for the antenna ports are mapped to REs in OFDM symbols not containing DMRS or CSI-RS in a frequency first manner, while the precoded modulation symbols for the antenna ports are mapped to REs in OFDM symbols containing DMRS or CSI-RS in a time first manner. This can be expressed as the following, using the terminology of 3GPP TS 36.211, section 6.3.5:

If DMRS based SFBC or LD-CDD is configured, then the mapping of precoded modulation symbols is such that:

in OFDM symbols not containing CSI-RS or DMRS, the mapping to resource elements (k,l) on antenna port p not reserved for other purposes shall be in increasing order of first the index k over the assigned physical resource blocks and then the index l, starting with the first slot in a subframe, and in OFDM symbols l and l+1 containing CSI-RS or DMRS, the mapping to resource elements (k,l) on antenna port p not reserved for other purposes shall continue in OFDM symbol l from OFDM symbol l−1 and be in increasing order of first the index l over the assigned physical resource blocks and then the index k.

In an alternative embodiment, for each allocated RB, STBC applies only to RE pairs in one subcarrier in OFDM symbols containing DMRS and/or CSI-RS if there are odd number of REs in each of the OFDM symbols. An example is shown in FIG. 16, where STBC is applied to symbol pairs $\{y(20),y(21)\}$, $\{y(58),y(59)\}$, and $\{y(88),y(89)\}$ on one subcarrier, e.g. subcarrier 0.

Figure 16:
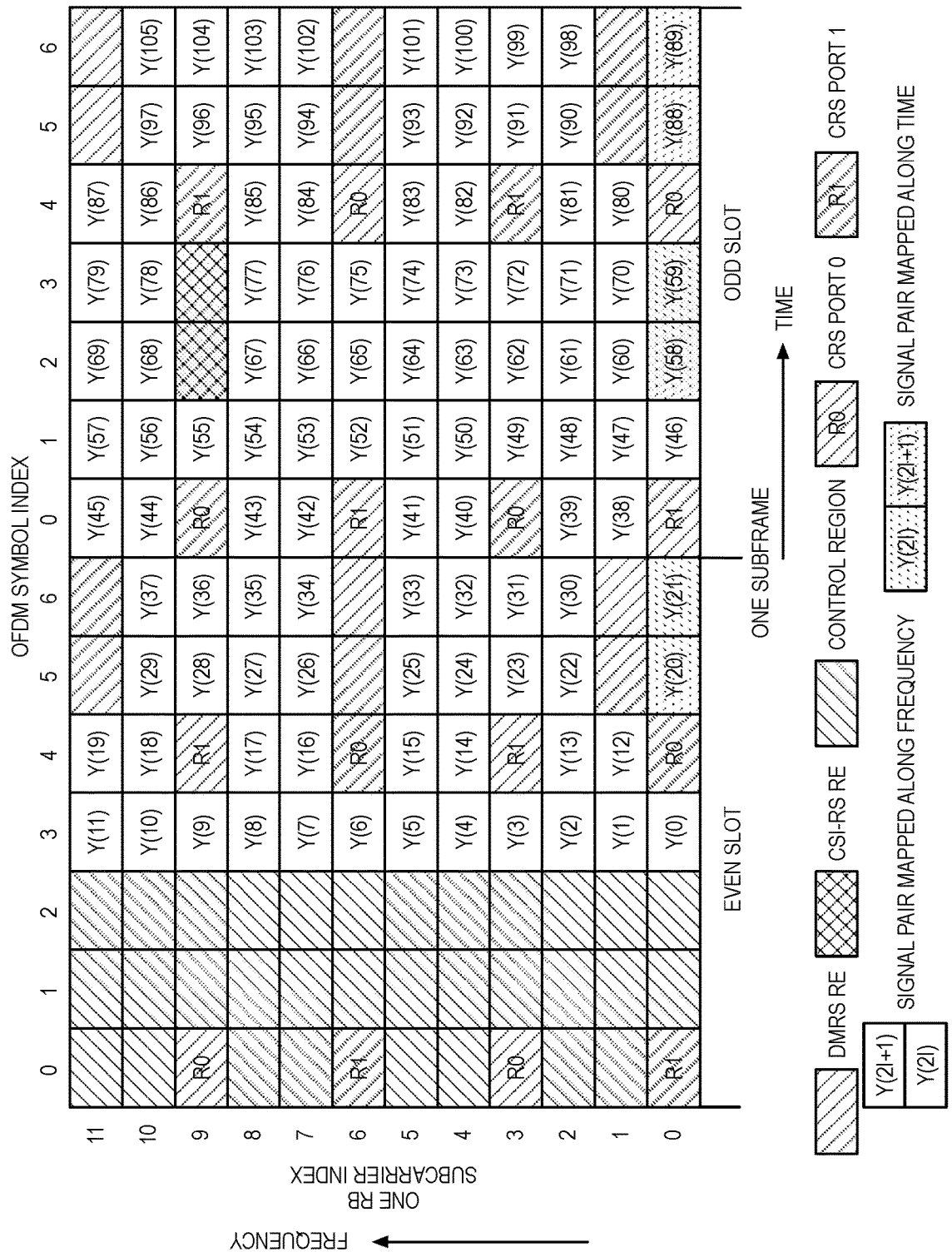
FIG. 16 illustrates an example of applying STBC only to one pair of REs in OFDM symbols containing DMRS or CSI-RS according to some embodiments of the present disclosure.

In yet another embodiment, when multiple blocks of contiguous RBs are allocated to a UE, the mapping in FIG. 16 is applied to one RB in each block of contiguous RBs if there are an odd number of REs in the OFDM symbols containing DMRS and/or CSI-RS over the block of RBs. In one scenario, each block of RBs are within a precoding RB group (PRG), i.e. RBs sharing the same precoder.

Figure 17:
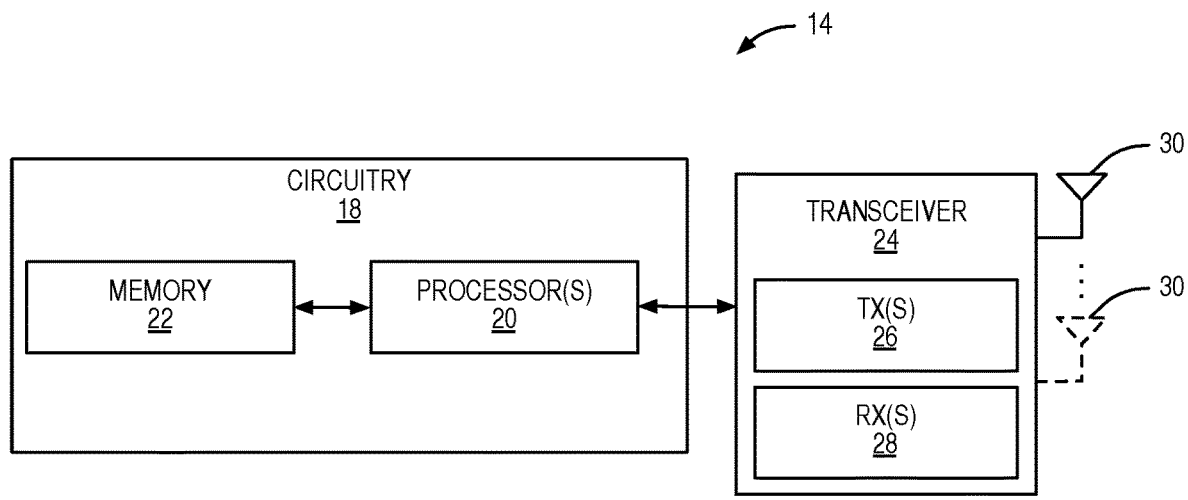
FIGS. 17 and 18 illustrate example embodiments of a wireless device according to some embodiments of the present disclosure.
Figure 18:
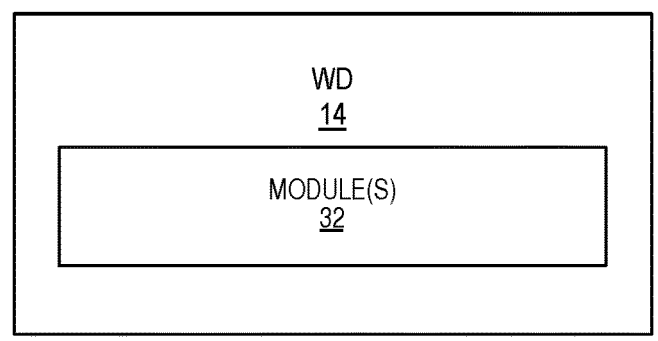

FIGS. 17 and 18 illustrate example embodiments of a second node 14 such as a wireless device 14 according to some embodiments of the present disclosure. FIG. 17 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 18 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 19:
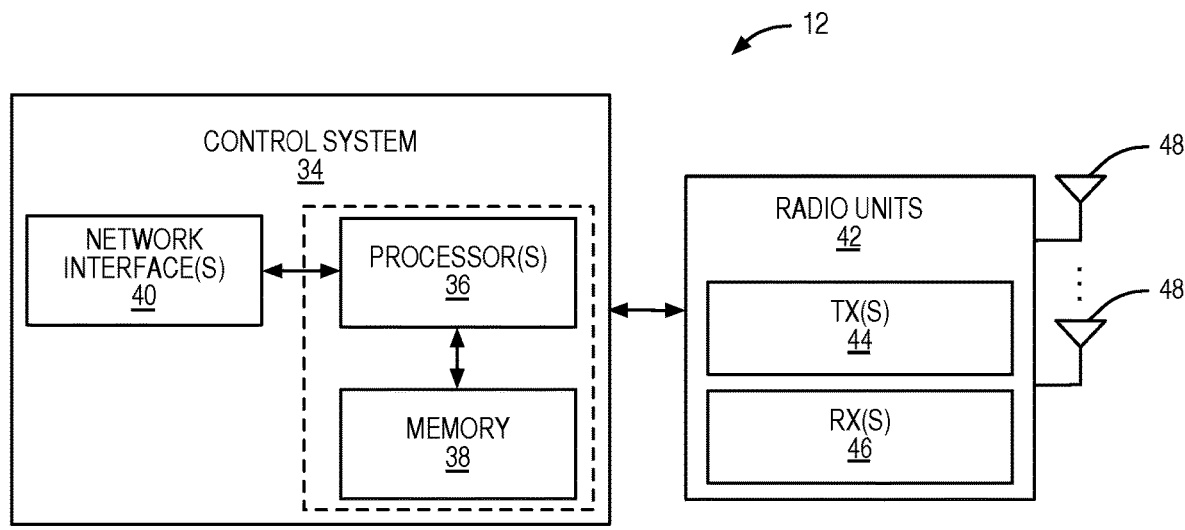
FIGS. 19 through 21 illustrate example embodiments of a radio network node according to some embodiments of the present disclosure.
Figure 21:
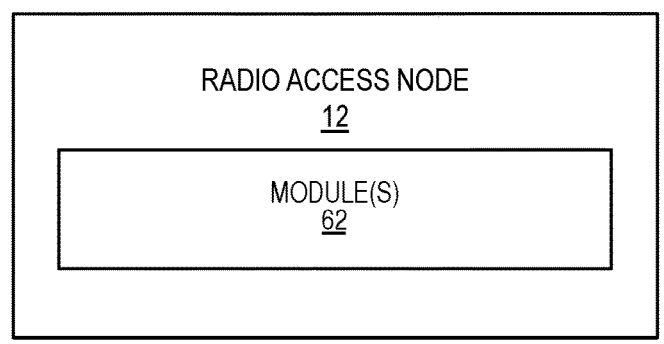
Figure 20:
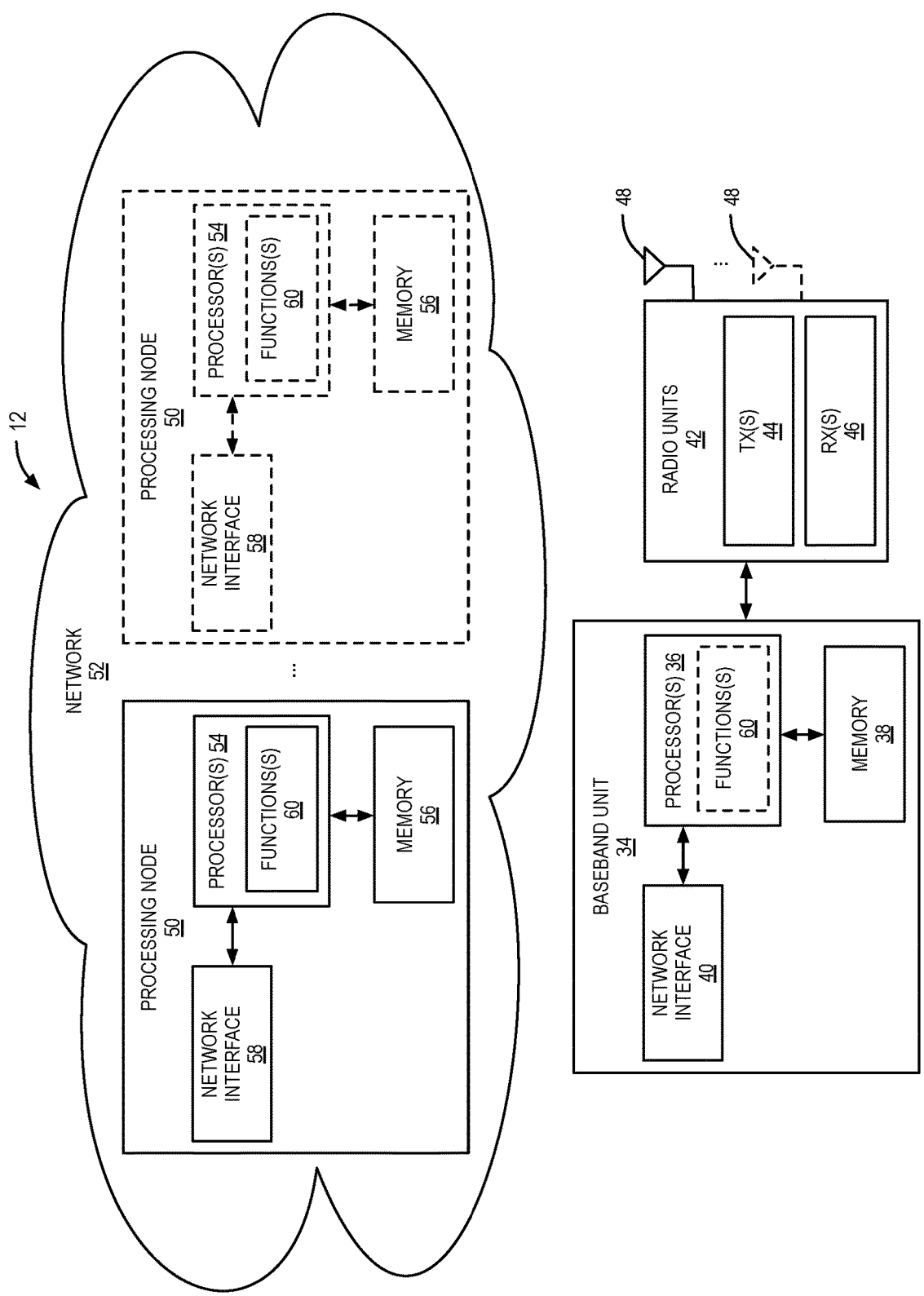

FIGS. 19 through 21 illustrate example embodiments of a radio network node according to some embodiments of the present disclosure. FIG. 19 is a schematic block diagram of the radio access node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 20 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 19. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 21 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

The following acronyms are used throughout this disclosure.

3GPP Third Generation Partnership Project
5G Fifth Generation
ASIC Application Specific Integrated Circuits
CPU Central Processing Unit
CQI Channel Quality Indicator
CRS Cell-specific Reference Signal
CSI Channel State Information
CSI-RS Channel State Information-Reference Signal
DFT Discrete Fourier Transform
DL Downlink
DMRS Demodulation Reference Signal
EPDCCH Enhanced PDCCH
FPGA Field Programmable Gate Arrays
GSM Global System for Mobile communications
LD-CDD Large Delay Cyclic-Delay Diversity
LTE Long Term Evolution
MIMO Multiple Input Multiple Output
MMSE-IRC Minimum Mean Square Error Interference Rejection Combining
NR New Radio
OCC Orthogonal Cover Codes
OFDM Orthogonal Frequency-Division Multiplexing
OL Open Loop
PDCCH Physical Downlink Control Channel
PDCCH Physical Downlink Shared Channel
PMI Precoding Matrix Indicator
PRB Physical Resource Block
PRG Precoding RB Group
RB Resource Block
RE Resource Element
RI Rank Indicator
RS Reference Signal
SFBC Space Frequency Block Coding
STBC Space Time Block Coding
UE User Equipment
UMB Ultra Mobile Broadband
WCDMA Wideband Code-Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method of operation of a first node with multiple transmit antennas in a wireless communication network for providing time and frequency diversity, comprising:
    (a) precoding modulation symbol pairs intended for a second node according to two antenna ports on which they are to be transmitted;
    (b) in a first subset of Orthogonal Frequency-Division Multiplexing (OFDM) symbols not containing Demodulation Reference Signals (DMRS) and/or Channel State Information Reference Signals (CSI-RS), mapping the precoded modulation symbol pairs to resource elements of the first subset of OFDM symbols by using Space Frequency Block Coding (SFBC)

(c) in a different subset of OFDM symbols having at least two adjacent OFDM symbols containing DMRS and/or CSI-RS,
   (i) mapping one pair of the precoded modulation symbol pairs to one pair of the resource elements in the two adjacent OFDM symbols by using Space Time Block Coding (STBC); and
   (ii) mapping the remaining precoded modulation symbol pairs to the remaining resource elements in the same two adjacent OFDM symbols using the SFBC;

(d) wherein the resource elements are comprised in each one or more Resource Blocks (RBs), and are not allocated for DMRS or CSI-RS.

2. The method of claim 1 further comprising:
configuring the second node with a downlink semi-open-loop transmission scheme; and
transmitting, to the second node, the precoded modulation symbol pairs over the mapped resource elements of the two antenna ports.

3. The method of claim 1 wherein the first subset of OFDM symbols does not contain a Demodulation Reference Signal (DMRS) or a Channel State Information Reference Signal (CSI-RS).

4. The method of claim 1 wherein the STBC is applied in OFDM symbols containing a Demodulation Reference Signal (DMRS) or a Channel State Information Reference Signal (CSI-RS).

5. The method of claim 1 wherein the two antenna ports are Demodulation Reference Signal (DMRS) ports.

6. The method of claim 1 wherein the STBC is used over the two adjacent OFDM symbols in a first or a last subcarrier in a Physical Resource Block (PRB) where each resource element in the first OFDM symbol of the pair is paired with only one resource element in the other symbol of the pair.

7. The method of claim 1 wherein using the STBC comprises using the STBC but not using the SFBC on a first or a last Physical Resource Block (PRB) of a Precoding Resource Block Group (PRG); or the first or the last PRB of resource allocation.

8. The method of claim 1 wherein every resource element is assigned an OFDM symbol from either the first subset of OFDM symbols or the different set of OFDM symbols.

9. The method of claim 1 wherein, for a plurality of signal pairs, each signal pair is mapped to a same Resource Block (RB).

10. The method of claim 1 wherein a block of the RBs is within a Precoding RB Group (PRG).

11. The method of claim 1 wherein the mapping the precoded modulation symbol pairs to the resource elements for the first subset of OFDM symbols and the mapping the precoded modulation symbol pairs to the resource elements for the different subset of OFDM symbols are based on a Demodulation Reference Signal (DMRS).

12. The method of claim 1 wherein:
for an allocated Resource Block (RB) in the different subset of OFDM symbols, mapping the precoded modulation symbol pairs to the resource elements applies only to the resource elements in the adjacent OFDM symbols containing a Demodulation Reference Signal (DMRS) and/or a Channel State Information Reference Signal (CSI-RS).

13. The method of claim 1 wherein mapping the precoded modulation symbol pairs to the resource elements for the first subset of OFDM symbols and the different subset of OFDM symbols comprises:
for each of the two antenna ports:
   for OFDM symbols not reserved for a Demodulation Reference Signal (DMRS) or a Channel State Information Reference Signal (CSI-RS) mapping a block of complex-valued symbols $\{y^{(p)}(0), y^{(p)}(1), \ldots, y^{(p)}(M_{symb}^{layer}-1)\}$ in sequence starting with $y^{(p)}(0)$ to resource element (k,l) on antenna port $p \in \{7,8\}$ in a first increasing order of an index k over assigned Resource Blocks (RBs) and then an index l, starting with a first slot in a subframe, where k is a subcarrier index and $l \in \{0,1, \ldots, 6\}$ is an OFDM symbol index; and
   for OFDM symbols reserved for the DMRS or the CSI-RS, if there is an odd number of resource elements, which are not used for the DMRS or the CSI-RS, per OFDM symbol, mapping symbol pair $\{y^{(p)}(2i), y^{(p)}(2i+1)\}$ to resource elements in a first or a last subcarrier of the two adjacent OFDM symbols in the PRB, $\{(k,l), (k,l+1)\}$, and mapping the remaining data symbols in a second increasing order of the index k over the assigned RBs.

14. The method of claim 1 wherein mapping the precoded modulation symbol pairs to the resource elements for the first subset of OFDM symbols and the different subset of OFDM symbols comprises:
if a Demodulation Reference Signal (DMRS) based or Large Delay Cyclic Delay Diversity (LD-CDD) is configured, then the mapping of precoded modulation symbol pairs is such that:
in OFDM symbols not containing a Channel State Information Reference Signal (CSI-RS) or the DMRS, the mapping to the resource elements (k,l) on antenna port p not reserved for a (DMRS) or a (CSI-RS) will be in a first increasing order of an index k over the RBs and then an index l, starting with a first slot in a subframe, and
in OFDM symbols l and l+1 containing the CSI-RS or the DMRS in a Physical Resource Block (PRB) comprising an odd number of resource elements per OFDM symbol, which are not used for the CSI-RS or the DMRS, the mapping to the resource elements (k,l) on antenna port p not reserved for the DMRS or the CSI-RS continues in OFDM symbol l from OFDM symbol l−1 and to OFDM symbol l+1 in a first subcarrier, and continues in a second increasing order of the index k starting from (k+1,l) over the RBs.

15. The method of claim 1 wherein the first node is a radio access node.

16. A first node, comprising:
at least one processor;
memory comprising instructions executable by the at least one processor whereby the first node is operable to:
   (a) precode modulation symbol pairs intended for a second node according to two antenna ports on which the precoded modulation symbol pairs are to be transmitted;
   (b) in a first subset of Orthogonal Frequency-Division Multiplexing (OFDM) symbols not containing Demodulation Reference Signals (DMRS) and/or Channel State Information Reference Signals (CSI-RS) map the precoded modulation symbol pairs to resource elements of the first subset of OFDM symbols by using Space Frequency Block Coding (SFBC);

(c) in a different subset of OFDM symbols having at least two adjacent OFDM symbols containing DMRS and/or CSI-RS,
   (i) map one pair of the precoded modulation symbol pairs to the one pair of resource elements in the two adjacent OFDM symbols by using Space Time Block Coding (STBC); and (ii) map the remaining precoded modulation symbol pairs to the remaining resource elements in the same two adjacent OFDM symbols using the SFBC;

(d) wherein the resource elements are comprised in each of one or more Resource Blocks (RBs), and are not allocated for DMRS or CSI-RS.

17. A method of operation of a second node in a wireless communication network for providing time and frequency diversity, comprising:
   (a) precoding modulation symbol pairs intended for the second node according to two antenna ports on which they are to be transmitted;
   (b) in a first subset of Orthogonal Frequency-Division Multiplexing (OFDM) symbols not containing Demodulation Reference Signals (DMRS) and/or Channel State Information Reference Signals (CSI-RS) receiving the precoded modulation symbol pairs mapped to resource elements of the first subset of OFDM symbols by using Space Frequency Block Coding (SFBC);
   (c) in a different subset of OFDM symbols having at least two adjacent OFDM symbols containing DMRS and/or CSI-RS,
      (i) receiving one pair the precoded modulation symbol pairs mapped to one pair of the resource elements in the two adjacent OFDM symbols by using Space Time Block Coding (STBC); and
      (ii) receiving the remaining precoded modulation symbol pairs mapped to the remaining resource elements in the same two adjacent OFDM symbols using the SFBC; and
   (d) wherein the resource elements are comprised in each of one or more Resource Blocks (RBs), and are not allocated for DMRS or CSI-RS.

18. The method of claim 17 further comprising:
being configured by a first node with a downlink semi-open-loop transmission scheme; and
receiving, from the first node, the precoded modulation symbol pairs over the mapped resource elements of the two antenna ports.

19. The method of claim 17 wherein the first subset of OFDM symbols does not contain a Demodulation Reference Signal (DMRS) or a Channel State Information Reference Signal (CSI-RS).

20. The method of claim 17 wherein the STBC is applied in OFDM symbols containing a Demodulation Reference Signal (DMRS) or a Channel State Information Reference Signal (CSI-RS).

21. The method of claim 17 wherein the two antenna ports are Demodulation Reference Signal (DMRS) ports.

22. The method of claim 17 wherein the STBC is used over a pair of adjacent OFDM symbols in a first or a last subcarrier in a Physical Resource Block (PRB) where each resource element in a first OFDM symbol of the pair is paired with only one resource element in the other symbol of the pair.

23. The method of claim 17 wherein using the STBC comprises using the STBC but not using the SFBC on a first or a last Physical Resource Block (PRB) of a Precoding Resource Block Group (PRG); or the first or the last PRB of resource allocation.

24. The method of claim 17 wherein every resource element is assigned an OFDM symbol from either the first subset of OFDM symbols or the different set of OFDM symbols.

25. The method of claim 17 wherein, for a plurality of signal pairs, each signal pair is mapped to a same RB.

26. The method of claim 17 wherein a block of the RBs is within a precoding RB group (PRG).

27. The method of claim 17 wherein mapping the precoded modulation symbol pairs to the resource elements for the first subset of OFDM symbols and mapping the precoded modulation symbol pairs to the resource elements for the different subset of OFDM symbols are based on a Demodulation Reference Signal (DMRS).

28. The method of claim 17 wherein:
for each RB, in the different subset of OFDM symbols, mapping the precoded modulation symbol pairs to the resource elements applies only to the resource elements in the two adjacent OFDM symbols containing a Demodulation Reference Signal (DMRS) and/or a Channel State Information Reference Signal (CSI-RS).

29. The method of claim 17 wherein mapping the precoded modulation symbol pairs to the resource elements for the first subset of OFDM symbols and the different subset of OFDM symbols comprises:
for each antenna port:
   for OFDM symbols not reserved for a Demodulation Reference Signal (DMRS) or a Channel State Information Reference Signal (CSI-RS), mapping a block of complex-valued symbols $\{y^{(p)}(0), y^{(p)}(1), \ldots, y^{(p)}(M_{symb}^{layer}-1)\}$ in sequence starting with $y^{(p)}(0)$ to the resource elements (k,l) on antenna port $p \in \{7,8\}$ in a first increasing order of an index k over assigned Resource Blocks, RBs, and then an index l, starting with a first slot in a subframe, where k is a subcarrier index and $l \in \{0,1, \ldots, 6\}$ is an OFDM symbol index; and
   for OFDM symbols reserved for the DMRS or the CSI-RS, mapping symbol pair $\{y^{(p)}(2i), y^{(p)}(2i+1)\}$ to the resource elements in adjacent OFDM symbols, $\{(k,l), (k,l+1)\}$ in a second increasing order of first the index k over the assigned RBs and then the index l.

30. The method of claim 17 wherein mapping the precoded modulation symbol pairs to the resource elements for the first subset of OFDM symbols and the different subset of OFDM symbols comprises:
if a Demodulation Reference Signal (DMRS) based Space Frequency Block Coding (SFBC) or Large Delay Cyclic Delay Diversity (LD-CDD) is configured, then the mapping of the precoded modulation symbol pairs is such that:
   in OFDM symbols not containing a Channel State Information Reference Signal (CSI-RS) or the DMRS, the mapping to resource elements (k,l) on antenna port p not reserved for a DMRS or a CSI-RS will be in a first increasing order of an index k over the RBs and then an index l, starting with a first slot in a subframe, and
   in OFDM symbols l and l+1 containing the CSI-RS or the DMRS in a PRB comprising an odd number of resource elements per OFDM symbol, which are not used for the CSI-RS or the DMRS, the mapping to resource elements (k,l) on antenna port p not reserved for the DMRS or the CSI-RS continues in OFDM symbol l from OFDM symbol l−1 and to OFDM symbol l+1 in a first subcarrier, and continues in a second increasing order of the index k starting from (k+1,l) over the RBs.

31. The method of claim 17 wherein the second node is a wireless device.

32. A second node, comprising:
   at least one processor;
   memory comprising instructions executable by the at least one processor whereby the second node is operable to:
   (a) precode modulation symbol pairs intended for the second node according to two antenna ports on which the precoded modulation symbol pairs are to be transmitted;
   (b) in a first subset of Orthogonal Frequency-Division Multiplexing (OFDM) symbols not containing Demodulation Reference Signals (DMRS) and/or Channel State Information Reference Signals (CSI-RS) receive the precoded modulation symbol pairs mapped to resource elements of the first set of OFDM symbols by using Space Frequency Block Coding (SFBC) and
   (c) in a different subset of OFDM symbols having at least two adjacent OFDM symbols containing DMRS and/or CSI-RS,
      (i) receive one pair of the precoded modulation symbol pairs mapped to one pair of resource elements in the two adjacent OFDM symbols by using Space Time Block Coding (STBC);
      (ii) receive the remaining precoded modulation symbol pairs mapped to the remaining resource elements in the same two adjacent OFDM symbols using the SFBC; and
   (d) wherein the resource elements are comprised in each of one or more Resource Blocks (RBs) and are not allocated for DMRS or CSI-RS.

* * * * *